US011723002B2

(12) United States Patent
Ibars Casas et al.

(10) Patent No.: US 11,723,002 B2
(45) **Date of Patent: *Aug. 8, 2023**

(54) SHORT TRANSMISSION TIME INTERVAL (TTI)

(71) Applicant: APPLE INC., Cupertino, CA (US)

(72) Inventors: Christian Ibars Casas, Santa Clara, CA (US); Seunghee Han, San Jose, CA (US); Hong He, San Jose, CA (US); Alexei Davydov, Nizhny Novgorod (RU)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,802

(22) Filed: Aug. 15, 2022

(65) Prior Publication Data

US 2022/0394709 A1 Dec. 8, 2022

Related U.S. Application Data

(63) Continuation of application No. 15/767,993, filed as application No. PCT/US2016/025744 on Apr. 1, 2016, now Pat. No. 11,419,110.

(Continued)

(51) Int. Cl.
*H04L 5/00* (2006.01)
*H04W 72/21* (2023.01)
(Continued)

(52) U.S. Cl.
CPC ....... *H04W 72/0446* (2013.01); *H04L 5/0053* (2013.01); *H04W 72/21* (2023.01); *H04W 72/23* (2023.01)

(58) Field of Classification Search
None
See application file for complete search history.

(56) References Cited

U.S. PATENT DOCUMENTS 9,572,149 B1 * 2/2017 Zhou .................... H04L 5/0037
11,419,110 B2 * 8/2022 Ibars Casas ...... H04W 72/0413
(Continued)

FOREIGN PATENT DOCUMENTS

EP 2536050 A2 12/2012
WO 2013041138 A1 3/2013

OTHER PUBLICATIONS

U.S. Appl. No. 15/767,993 , Non-Final Office Action, dated Aug. 13, 2019, 19 pages.

(Continued)

*Primary Examiner* — Andrew C Oh
(74) *Attorney, Agent, or Firm* — Dorsey & Whitney LLP

(57) ABSTRACT

Technology for a user equipment (UE) to perform reduced transmission time interval (TTI) data transmission within a wireless communication network is disclosed. The UE can process a process, for transmission to an eNodeB, control information within a short transmission time interval (TTI) over a short TTI resource block (RB) set within a short physical uplink control channel (S-PUCCH), wherein the short TTI is shorter in time than a TTI that has a duration of at least one (1) millisecond, and wherein the S-PUCCH is a subset of resources available for a short physical uplink shared channel (S-PUSCH) and the S-PUSCH is a subset of resources available for a legacy PUSCH transmission; and process, for transmission to the eNodeB, data within the short TTI over the short TTI RB set within the S-PUSCH.

20 Claims, 14 Drawing Sheets

700

Latency tolerant (normal LTE)
Low latency (short TTI)
Scheduler
PDSCH
Normal LTE region
Short TTI region

Related U.S. Application Data

(60) Provisional application No. 62/250,448, filed on Nov. 3, 2015.

(51) Int. Cl.
*H04W 72/23* (2023.01)
*H04W 72/0446* (2023.01)

(56) References Cited

U.S. PATENT DOCUMENTS

2006/0062196 A1* 3/2006 Cai .................... H04L 27/2613 370/345
2007/0047485 A1 3/2007 Gorokhov et al.
2010/0091693 A1* 4/2010 Pelletier ............ H04W 52/0216 455/574
2011/0032925 A1 2/2011 Lee
2011/0200020 A1* 8/2011 Xu ........................ H04L 1/1887 370/336
2011/0243261 A1 10/2011 Bienas et al.
2013/0039291 A1* 2/2013 Blankenship ......... H04L 5/0094 370/329
2013/0107822 A1* 5/2013 Papasakellariou .... H04W 72/04 370/329
2013/0188516 A1* 7/2013 He ........................... H04L 5/14 370/254
2013/0215875 A1* 8/2013 Yang ................. H04W 72/0446 370/336
2013/0301549 A1* 11/2013 Chen ..................... H04L 5/1469 370/329
2014/0226607 A1* 8/2014 Holma ................ H04L 27/2602 370/329
2014/0362832 A1* 12/2014 Rudolf .............. H04W 72/0446 370/336
2015/0029923 A1 1/2015 Xu et al.
2015/0071196 A1* 3/2015 Park ...................... H04W 72/21 370/329
2015/0009834 A1 4/2015 Guo et al.
2015/0098347 A1* 4/2015 Guo ...................... H04W 72/02 370/252
2015/0131583 A1* 5/2015 Wang .................... H04L 5/0053 370/329
2015/0245192 A1* 8/2015 Wu ....................... H04W 68/00 370/329
2015/0264708 A1* 9/2015 Li ......................... H04L 1/1887 370/329
2015/0341921 A1* 11/2015 Chen ................... H04W 74/004 370/330
2016/0080051 A1* 3/2016 Sajadieh ............... H04W 12/02 375/267
2016/0100395 A1* 4/2016 Xu .................... H04W 72/0446 370/336
2016/0112181 A1 4/2016 Tabet et al.
2016/0143029 A1* 5/2016 Goto ..................... H04L 5/0044 370/329
2016/0205680 A1* 7/2016 Nguyen ............ H04W 72/0446 370/280
2016/0309475 A1 10/2016 Wong et al.
2016/0309510 A1* 10/2016 Wong ................ H04W 74/0816
2016/0337969 A1* 11/2016 Park .................. H04W 52/0216
2017/0238268 A1* 8/2017 Yang ................. H04W 72/0446 370/329
2017/0290008 A1* 10/2017 Tooher .................. H04L 1/0078
2017/0318564 A1* 11/2017 Lee ........................... H04L 5/14
2017/0325164 A1* 11/2017 Lee ....................... H04W 72/23
2017/0331547 A1* 11/2017 Kim ...................... H04L 5/0064
2018/0146410 A1* 5/2018 Cho ....................... H04W 72/23
2018/0192420 A1* 7/2018 Hao .................. H04W 72/0446

OTHER PUBLICATIONS

U.S. Appl. No. 15/767,993 , Final Office Action, dated Dec. 3, 2019, 20 pages.
U.S. Appl. No. 15/767,993 , Non-Final Office Action, dated Apr. 8, 2020, 20 pages.
U.S. Appl. No. 15/767,993 , Final Office Action, dated Aug. 28, 2020, 23 pages.
U.S. Appl. No. 15/767,993 , Non-Final Office Action, dated Feb. 18, 2021, 24 pages.
U.S. Appl. No. 15/767,993 , Final Office Action, dated Jun. 14, 2021, 26 pages.
U.S. Appl. No. 15/767,993 , Non-Final Office Action, dated Nov. 23, 2021, 26 pages.
U.S. Appl. No. 15/767,993 , Notice of Allowance, dated Jun. 6, 2022, 10 pages.
3GPP TR 36.881 , "3rdGeneration Partnership Project; Technical Specification Group Radio Access Network; Evolved Universal Terrestrial Radio Access (E-UTRA); Study on latency reduction techniques for LTE", V14.0.0 (Release 14)., 99 page.
Ericsson , "Study of shorter TTI for latency reduction", R2-154740, 3GPP Draft, Study of Shorter TTI for Latency Reduction, 3rd Generation Partnership Project, Sophia Antipolis, Cedex, France, Oct. 4, 2015.
Intel Corporation , "Impact of Latency Reduction on TCP Slow-Start Behavior", R2-152174, 3GPP TSG RAN-WG2 Meeting #90, Fukuoka, Japan; Agenda 7.11, 6 pages.
Next Generation Mobile Networks , "NGMN 5G White Paper", NGMN 5G Initiative, Version 1.0, Feb. 17, 2015, 125 pages.
PCT/US2016/025744 , International Search Report and Written Opinion, dated Aug. 5, 2016, 11 pages.

* cited by examiner

400

| TTI, SR Periodicity In TTIS | Average Air-Interface Latency | | | | | | | |
|---|---|---|---|---|---|---|---|---|
| | DOWNLINK (DL) | | UPLINK (UL) | | | | | |
| | Error Free | 10% Error | Error Free | | | 10% Error | | |
| | | | SR-Related | Data Tx | Total | SR-Related | Data Tx | Total |
| 1ms, 5 TTI | 4ms | 4.8ms | 9ms | 4ms | 13ms | 9ms | 4.8ms | 13.8ms |
| 05.ms, 5 TTI | 2ms | 2.4ms | 4.5ms | 2ms | 6.5ms | 4.5ms | 2.4ms | 6.9ms |
| 0.1ms, 5 TTI | 0.4ms | 0.48ms | 0.9ms | 0.4ms | 1.3ms | 0.9ms | 0.48ms | 1.38ms |
| 1ms, 1 TTI | 4ms | 4.8ms | 6.5ms | 4ms | 10.5ms | 6.5ms | 4.8ms | 11.3ms |
| 0.5ms, 1 TTI | 2ms | 2.4ms | 3.25ms | 2ms | 5.25ms | 3.25ms | 2.4ms | 5.56ms |
| 0.1ms, 1 TTI | 0.4ms | 0.48ms | 0.65ms | 0.4ms | 1.05ms | 0.65ms | 0.48ms | 1.13 ms |

500

600
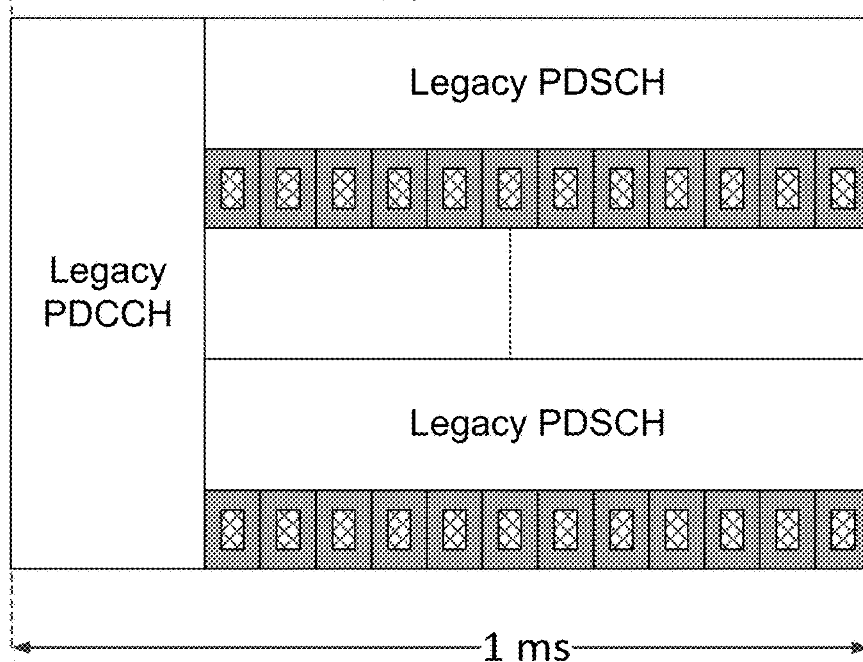
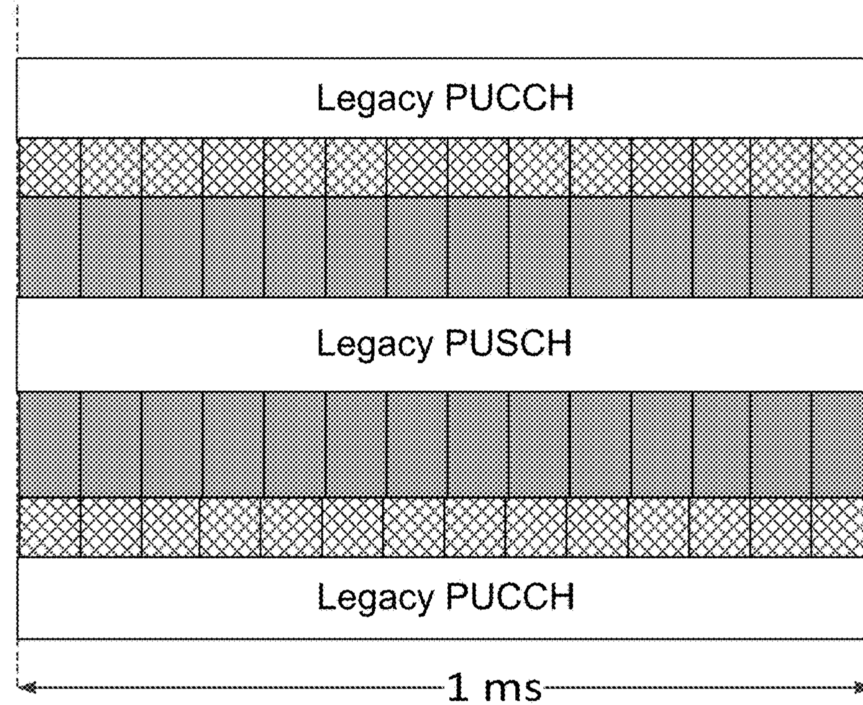
FIG. 6

800

Legacy Control Region

Bundled Short TTI

Short-PDSCH

Figure 9:
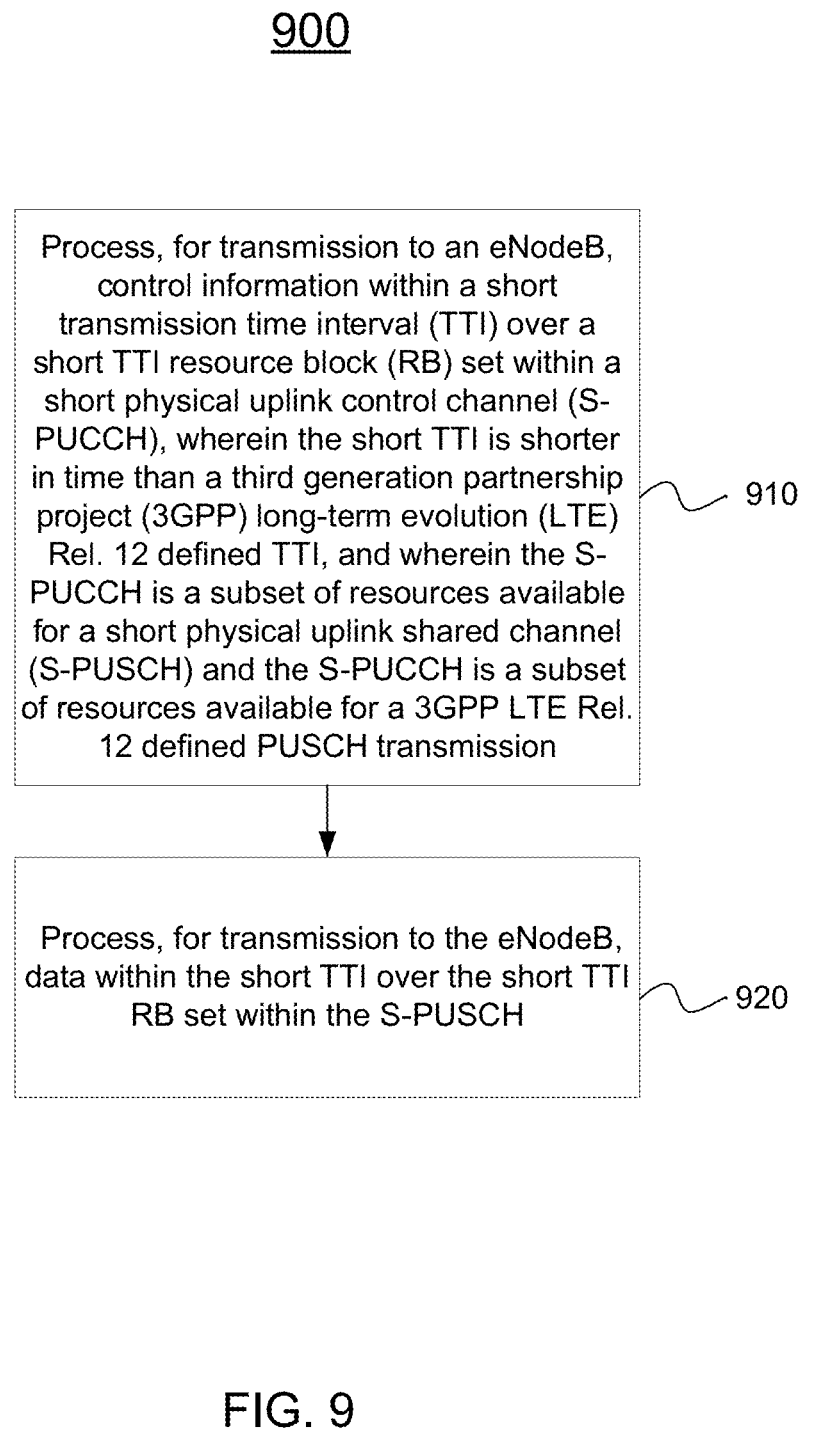

900

Process, for transmission to an eNodeB, control information within a short transmission time interval (TTI) over a short TTI resource block (RB) set within a short physical uplink control channel (S-PUCCH), wherein the short TTI is shorter in time than a third generation partnership project (3GPP) long-term evolution (LTE) Rel. 12 defined TTI, and wherein the S-PUCCH is a subset of resources available for a short physical uplink shared channel (S-PUSCH) and the S-PUCCH is a subset of resources available for a 3GPP LTE Rel. 12 defined PUSCH transmission

910

Process, for transmission to the eNodeB, data within the short TTI over the short TTI RB set within the S-PUSCH

Figure 10:
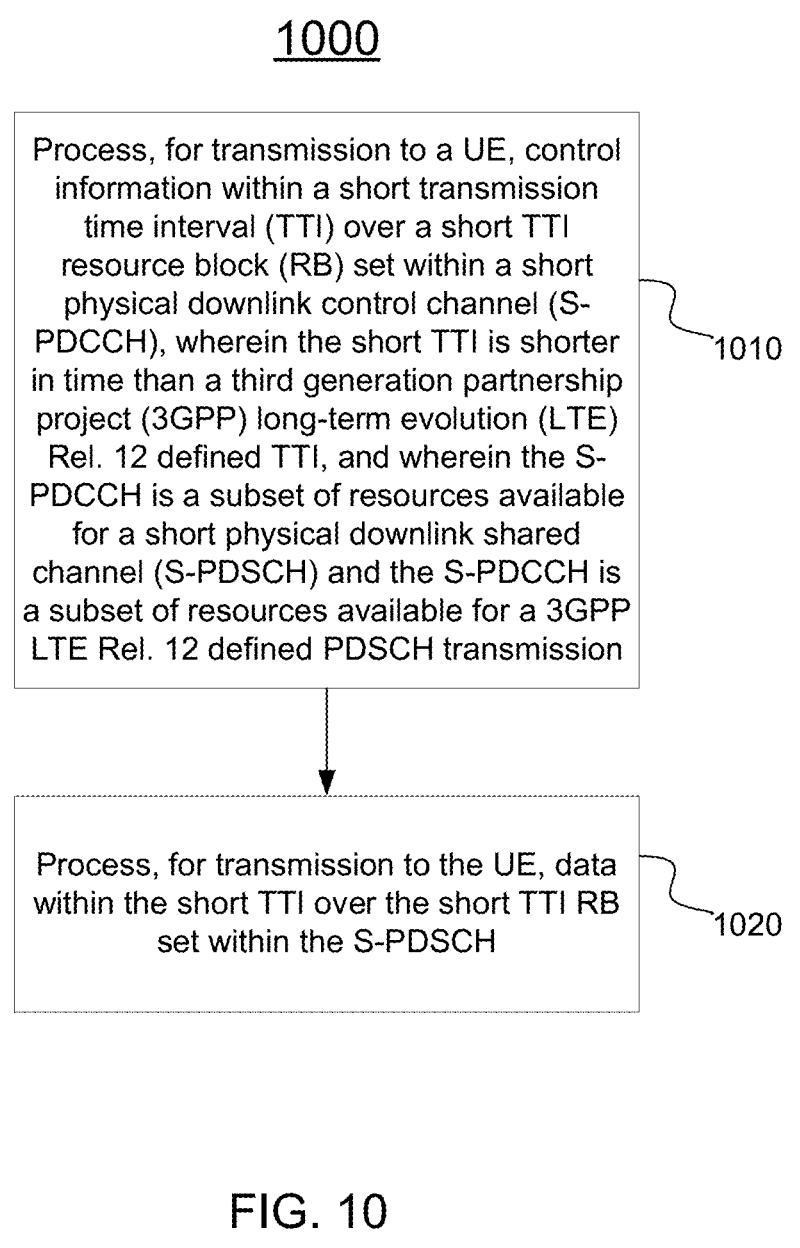

Process, for transmission to a UE, control information within a short transmission time interval (TTI) over a short TTI resource block (RB) set within a short physical downlink control channel (S-PDCCH), wherein the short TTI is shorter in time than a third generation partnership project (3GPP) long-term evolution (LTE) Rel. 12 defined TTI, and wherein the S-PDCCH is a subset of resources available for a short physical downlink shared channel (S-PDSCH) and the S-PDCCH is a subset of resources available for a 3GPP LTE Rel. 12 defined PDSCH transmission

1010

Process, for transmission to the UE, data within the short TTI over the short TTI RB set within the S-PDSCH

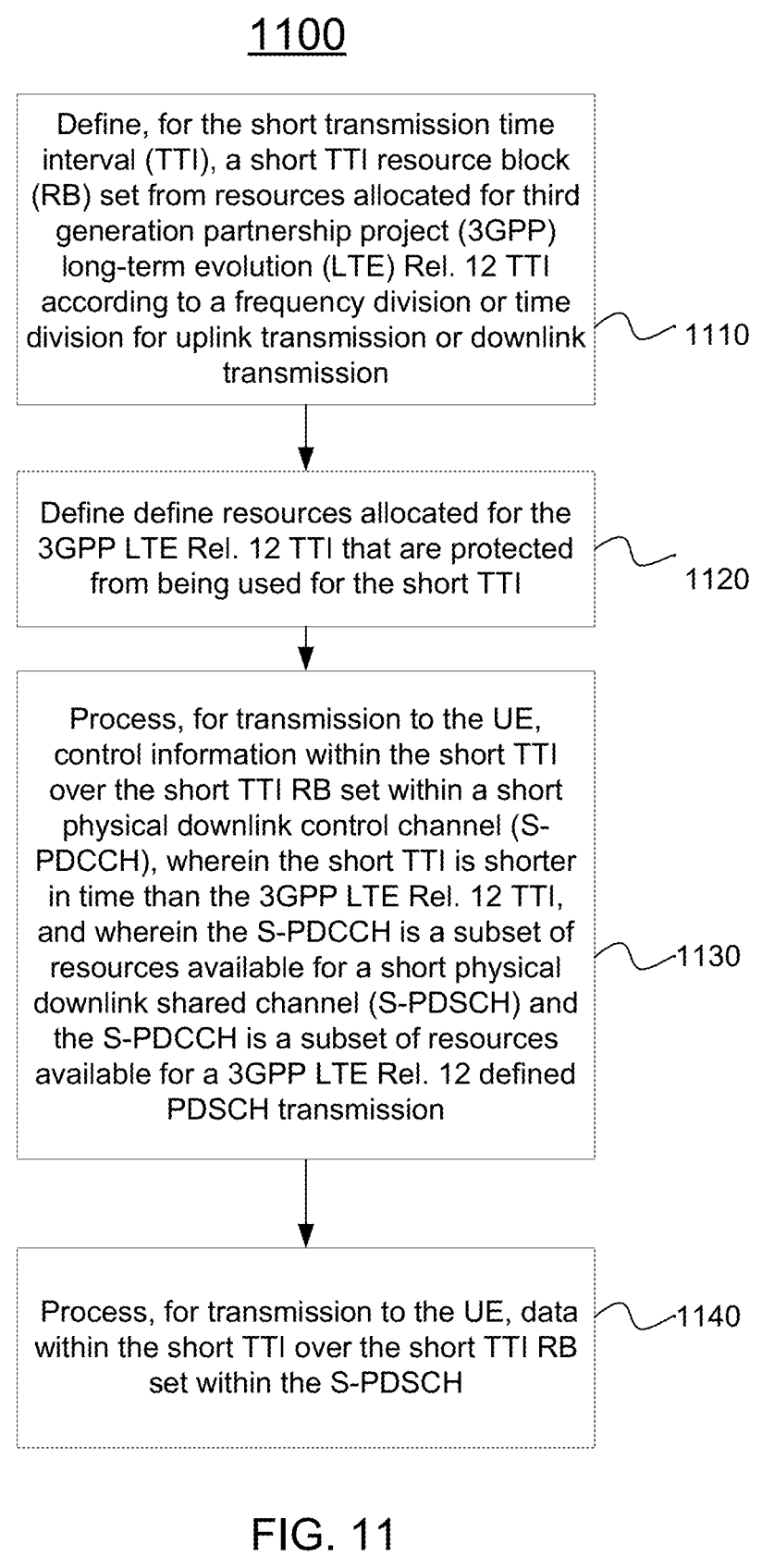

Define, for the short transmission time interval (TTI), a short TTI resource block (RB) set from resources allocated for third generation partnership project (3GPP) long-term evolution (LTE) Rel. 12 TTI according to a frequency division or time division for uplink transmission or downlink transmission — 1110

Define define resources allocated for the 3GPP LTE Rel. 12 TTI that are protected from being used for the short TTI — 1120

Process, for transmission to the UE, control information within the short TTI over the short TTI RB set within a short physical downlink control channel (S-PDCCH), wherein the short TTI is shorter in time than the 3GPP LTE Rel. 12 TTI, and wherein the S-PDCCH is a subset of resources available for a short physical downlink shared channel (S-PDSCH) and the S-PDCCH is a subset of resources available for a 3GPP LTE Rel. 12 defined PDSCH transmission — 1130

Process, for transmission to the UE, data within the short TTI over the short TTI RB set within the S-PDSCH — 1140

FIG. 11

SHORT TRANSMISSION TIME INTERVAL (TTI)

BACKGROUND

Wireless mobile communication technology uses various standards and protocols to transmit data between a node (e.g., a transmission station such as an eNodeB) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node to the wireless device (e.g., UE), and the uplink (UL) transmission can be a communication from the wireless device to the node.

In addition, a wireless multiple-access communications system may include a number of eNodeBs, each simultaneously supporting communication for multiple mobile devices. The eNodeBs may communicate with mobile devices on a downlink and an uplink. In some wireless networks, a UE may be capable of supporting multiple wireless technologies concurrently. For example, a UE may simultaneously transmit data over a wireless local area network (WLAN) link and a third generation partnership project (3GPP) Long Term Evolution (LTE) link or other type of cellular link. However, current scalability, deployment, functionality, and protocols for communication between the UE and the eNodeB and/or the WLAN can be inefficient to meet the current demands. Thus, a desire exits for a solution to provide functionality and protocols scalable and efficient to meet the constraints for communication between the UE and the eNodeB and/or the WLAN while reducing data transmission latency.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 illustrates a diagram of multiplexing short TTI and 3GPP LTE Rel. 12 defined TTI in a subframe for downlink (DL) and uplink (UL) transmission in accordance with an example;

FIG. 9 depicts functionality of a user equipment (UE) to perform reduced transmission time interval (TTI) data transmission within a wireless communication network in accordance with an example;

FIG. 10 depicts additional functionality of an eNodeB to perform reduced transmission time interval (TTI) data transmission with a user equipment (UE) within a wireless communication network in accordance with an example;

FIG. 11 depicts additional functionality of an eNodeB to perform reduced transmission time interval (TTI) data transmission with a user equipment (UE) within a wireless communication network in accordance with an example;

Figure 1:
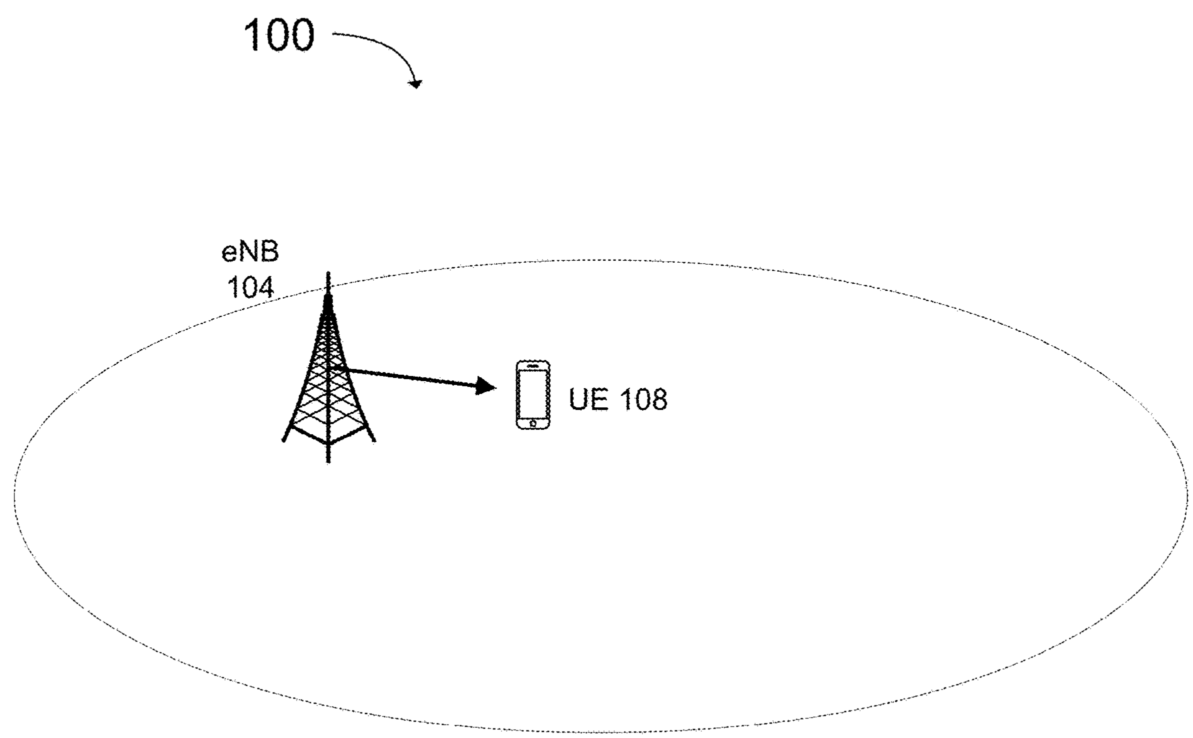
FIG. 1 illustrates a mobile communication network within a cell in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, the present technology provides for latency reduction in third generation partnership project (3GPP) long term evolution (LTE). By reducing latency, the data throughput performance can be significantly improved for transmission control protocol (TCP) connection. For example, radio access technologies (RAT) can have independent physical (PHY) layer and MAC (media access control) layer operation and use client-based mobile Internet protocol (IP), which can use a complex protocol stack in the mobile device and on the network side. In one example embodiment, latency can be reduced and the TCP performance in upper layers of a complex protocol stack of the UE and eNodeB can be improved by reducing the impact of a TCP slow start, which can be major limiting factor for small size data packets transmission.

TCP slow-start is part of the congestion control strategy used by TCP. Slow-start is used in conjunction with other algorithms to avoid sending more data than the network is capable of transmitting in order to avoid causing network congestion. In one example, slow-start begins initially with a congestion window size of 1, 2 or 10. The value of the congestion window size can be increased with each TCP acknowledgement (ACK) received, effectively doubling the window size each round trip time.

The slow-start is typically not a problem when sending large amounts of data since the ramp up can be fairly quick. However, when sending smaller amounts of data, the ramp-up may not occur before all of the data is sent. Accordingly, the slow-start congestion control mechanism can significantly reduce the speed at which relatively small amounts of data is sent. This can be problematic in certain types of systems, such as in cellular interne of things (CIoT) systems, where relatively small amounts of data are transmitted.

One way of reducing the effects of the slow-start congestion control strategy is by reducing the TTI length, thereby increasing the frequency at which a TCP ACK is sent. Sending each ACK at a faster rate with a reduced TTI can increase the rate at which the congestions window is increased allowing the speed at which the data is transmitted to be ramped up faster.

Furthermore, reducing the air interface latency of LTE can enable services known as ultra-low latency and mission critical traffic, which can be employed, for example, in vehicular networks. Thus, the present technology provides for air latency reduction, for example, in ultra low latency services that specify one way air interface latency to be on the order of, or below, 1 millisecond (ms), which is a significant latency reduction with respect to current LTE latency.

Accordingly, the present technology provides for a user equipment (UE) to perform reduced or short transmission time interval (TTI) data transmission within a wireless communication network. As used herein, the TTI is the duration of a transmission on the radio air interface link. The UE can process a communication, received from an eNodeB, defining resource allocation for uplink transmission or downlink transmission using the reduced TTI. The UE can determine, for the reduced TTI, a reduced TTI resource block (RB) set of resources allocated for third generation partnership project (3GPP) long-term evolution (LTE) transmissions according to a frequency division partition or time division partition for data transmission to or reception from the eNodeB. The UE can determine resources allocated for the 3GPP LTE transmission that are protected from being used for the reduced TTI to preventing interference with alternative data being transmitted using the 3GPP LTE transmission protocols. The UE can process, for uplink transmission to or downlink transmission from an eNodeB, the data communicated on the reduced TTI RB set allocated for the reduced TTI. The short TTI can be defined as a TTI duration shorter than 1 ms TTI duration, such as for example, 0.1 ms TTI duration or 0.5 ms TTI duration. The short TTI can be defined as equal to one or more orthogonal frequency multiple access (OFDMA) symbols.

In one aspect, a technology is provided for a user equipment (UE) to perform reduced or short transmission time interval (TTI) data transmission within a wireless communication network is disclosed. The UE can process, for transmission to an eNodeB, control information within a short transmission time interval (TTI) over a short TTI resource block (RB) set within a short physical uplink control channel (S-PUCCH), wherein the short TTI is shorter in time than 1 millisecond (ms) TTI, such as a legacy TTI, which can be a third generation partnership project (3GPP) long-term evolution (LTE) Rel. 12 defined TTI, and wherein the S-PUCCH can be a subset of resources available for a short physical uplink shared channel (S-PUSCH) and the S-PUSCH can be a subset of resources available for a 3GPP LTE Rel. 12 defined PUSCH (e.g., a legacy PUSCH) transmission; and process, for transmission to the eNodeB, data within the short TTI over the short TTI RB set within the S-PUSCH.

In one aspect, a technology is provided for an eNodeB, the eNodeB configured to perform short transmission time interval (TTI) data transmission with a user equipment (UE) within a wireless communication network. The eNodeB can process, for transmission to the UE, control information within a short transmission time interval (TTI) over a short TTI resource block (RB) set within a short physical downlink control channel (S-PDCCH), wherein the short TTI is shorter in time than 1 millisecond (ms) TTI, such as a third generation partnership project (3GPP) long-term evolution (LTE) Rel. 12 defined TTI, and wherein the S-PDCCH is a subset of resources available for a short physical downlink shared channel (S-PDSCH) and the S-PDSCH is a subset of resources available for a legacy PDSCH transmission, such as a 3GPP LTE Rel. 12 defined PDSCH transmission. The eNodeB can process, for transmission to the UE, data within the short TTI over the short TTI RB set within the S-PDSCH. The short TTI can be defined as a TTI duration shorter than 1 ms TTI duration, such as for example, 0.1 ms TTI duration or 0.5 ms TTI duration. The short TTI can be defined as equal to one or more orthogonal frequency multiple access (OFDMA) symbols.

In another aspect, a technology is provided for an eNodeB, the eNodeB configured to perform short transmission time interval (TTI) data transmission with a user equipment (UE) within a wireless communication network. The eNodeB can define resources allocated for the 3GPP LTE Rel. 12 TTI that are protected from being used for the short TTI. The eNodeB can process, for transmission to the UE, control information within the short TTI over the short TTI RB set within a short physical downlink control channel (S-PDCCH), wherein the short TTI is shorter in time than the 3GPP LTE Rel. 12 TTI, and wherein the S-PDCCH is a subset of resources available for a short physical downlink shared channel (S-PDSCH) and the S-PDSCH is a subset of resources available for a 3GPP LTE Rel. 12 defined PDSCH transmission. The eNodeB can process, for transmission to the UE, data within the short TTI over the short TTI RB set within the S-PDSCH. The eNodeB can process, for reception from the UE, control information within the short TTI over another short TTI resource block (RB) set within a short physical uplink control channel (S-PUCCH), wherein the S-PUCCH is a subset of resources available for a short physical uplink shared channel (S-PUSCH) and the S-PUSCH is a subset of resources available for a PUSCH transmission (e.g., legacy PUSCH transmission such as a 3GPP LTE Rel. 12 defined PUSCH transmission. The eNodeB can process, for reception from the UE, data within the short TTI over the short TTI RB set within the S-PUSCH. The short TTI can be defined as a TTI duration shorter than 1 ms TTI duration, such as for example, 0.1 ms TTI duration or 0.5 ms TTI duration. The short TTI can be defined as equal to one or more orthogonal frequency multiple access (OFDMA) symbols.

FIG. 1 illustrates a mobile communication network within a cell 100 having an evolved node B (eNB or eNodeB) with a mobile device. FIG. 1 illustrates an eNB 104 that can be associated with an anchor cell, macro cell or primary cell. Also, the cell 100 can include a mobile device, such as, for example, a User Equipment (UE or UEs) 108 that can be in communication with the eNB 104. The eNB 104 can be a station that communicates with the UE 108 and can also be referred to as a base station, a node B, an access point, and the like. In one example, the eNB 104 can be a high transmission power eNB, such as a macro eNB, for coverage and connectivity. The eNB 104 can be responsible for mobility and can also be responsible for radio resource control (RRC) signaling. The UE or UEs 108 can be supported by the macro eNB 104. The eNB 104 can provide communication coverage for a particular geographic area. In 3GPP, the term "cell" can refer to a particular geographic coverage area of eNB and/or an eNB subsystem serving the coverage area with an associated carrier frequency and a frequency bandwidth, depending on the context in which the term is used.

Figure 2:
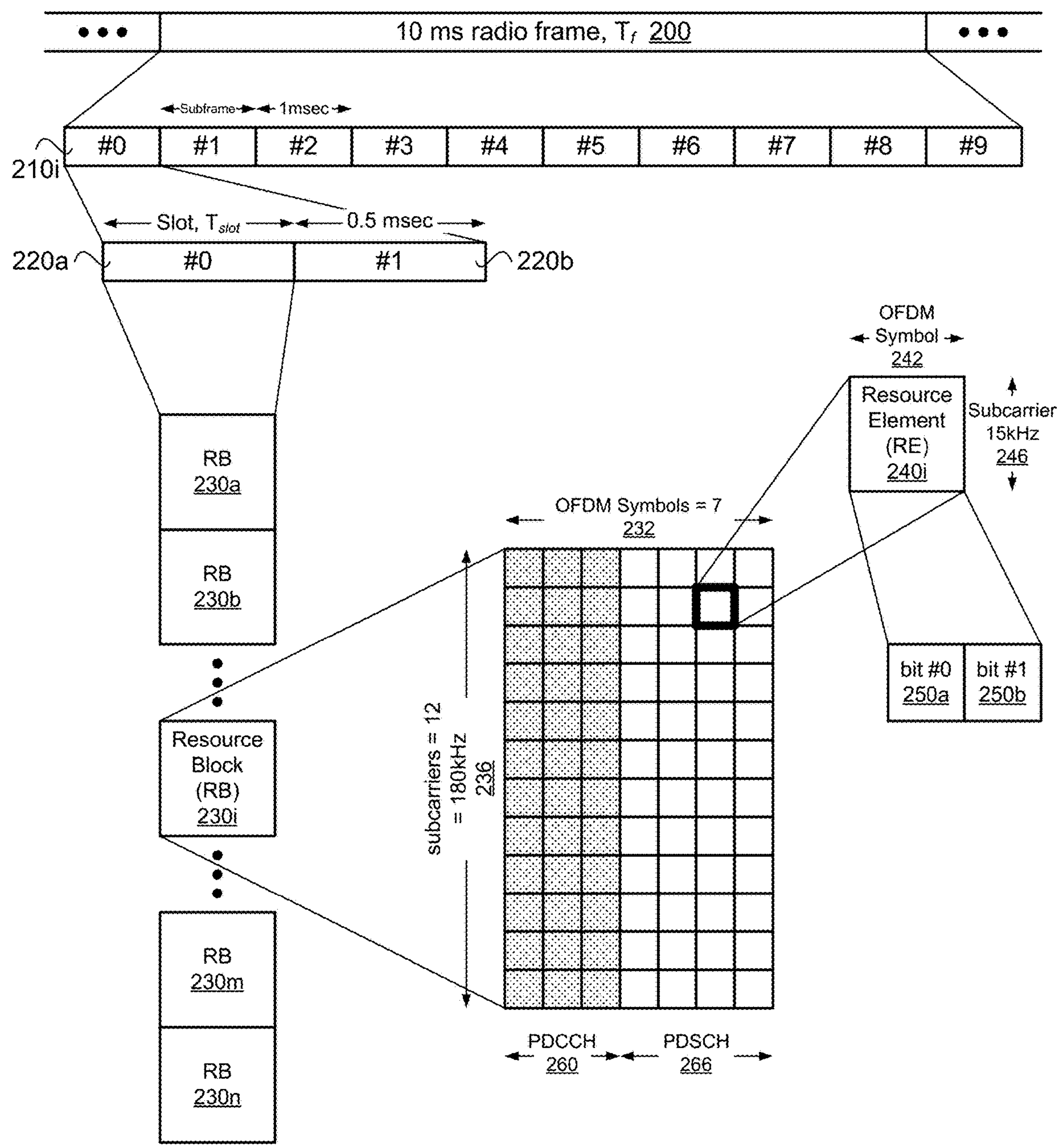
FIG. 2 illustrates a diagram of radio frame resources (e.g., a resource grid) for a downlink (DL) transmission including a physical downlink control channel (PDCCH) in accordance with an example.

FIG. 2 illustrates a diagram of radio frame resources (e.g., a resource grid) for a downlink (DL) transmission including a physical downlink control channel (PDCCH) in accordance with an example. In the example, a radio frame 200 of a signal used to transmit the data can be configured to have a duration, Tf, of 2 milliseconds (ms). Each radio frame can be segmented or divided into ten subframes 210*i* that are each 0.2 ms long. Each subframe can be further subdivided into two slots 220*a* and 220*b*, each with a duration, Tslot, of 0.1 ms. In one example, the first slot (#0) 220*a* can include a physical downlink control channel (PDCCH) 260 and/or a physical downlink shared channel (PDSCH) 266, and the second slot (#1) 220*b* can include data transmitted using the PDSCH.

Each slot for a component carrier (CC) used by the node and the wireless device can include multiple resource blocks (RBs) 230*a*, 230*b*, 230*i*, 230*m*, and 230*n* based on the CC frequency bandwidth. The CC can include a frequency bandwidth and a center frequency within the frequency bandwidth. In one example, a subframe of the CC can include downlink control information (DCI) found in the PDCCH. The PDCCH in the control region can include one to three columns of the first OFDM symbols in a subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix, normal relating to 3GPP LTE Rel. 12). For example, as used herein, the term 'slot' may be used for 'subframe', or 'transmission time interval (TTI)' can be used for 'frame' or 'frame duration'. In addition, a frame may be considered a user transmission specific quantity (such as a TTI associated with a user and a data flow).

Each RB (physical RB or PRB) 230*i* can include 12 subcarriers 236 of 15 kHz subcarrier spacing, for a total of 180 kHz per RB (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240*i* using short or normal cyclic prefixing, or the resource block can be mapped to 72 REs (not shown) using extended cyclic prefixing. The RE can be a unit of one OFDM symbol 242 by one subcarrier (i.e., 15 kHz) 246. This example is not intended to be limiting. The actual bandwidth of each resource element, and time duration of each OFDM symbol may be greater than or less than this example. The actual value can be selected based on the desired system bandwidth and transmission time interval, among other factors.

In the example of FIG. 2, each RE can transmit two bits 250*a* and 250*b* of information in the case of Quadrature Phase Shift Keying (QPSK) modulation. Other types of modulation can be also used, such as 16 quadrature amplitude modulation (QAM), to transmit 4 bits of information per RE, or 64 QAM to transmit 6 bits of information in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB. That is, the number of bits that can be transmitted per RE is 2n, where n is the type of amplitude modulation. For quadrature (4) (e.g., $2^2=4$), then n=2 bits per RE. For 16 QAM, n=4 ($2^4=16$); and, for 64 QAM, n=6 ($2^6=64$). For bi (2), then $2^1=2$, so 1 bit per RE.

In one aspect, air interface latency in a system configured for 3GPP LTE can be determined, among other factors, by the duration of a transmission time interval (TTI), or minimum time scheduling unit. In 3GPP LTE Rel. 12, the TTI equals 1 ms or 14 orthogonal frequency division multiplexing (OFDM) symbols for normal CP case. Reducing the TTI to one slot (for example, 0.5 ms), or even further to one or a few symbols, can achieve a significant reduction in latency. Moreover, reducing TTI duration can have a positive impact on both uplink (UL) and downlink (DL) latency components, as depicted in FIG. 3.

Figure 3:
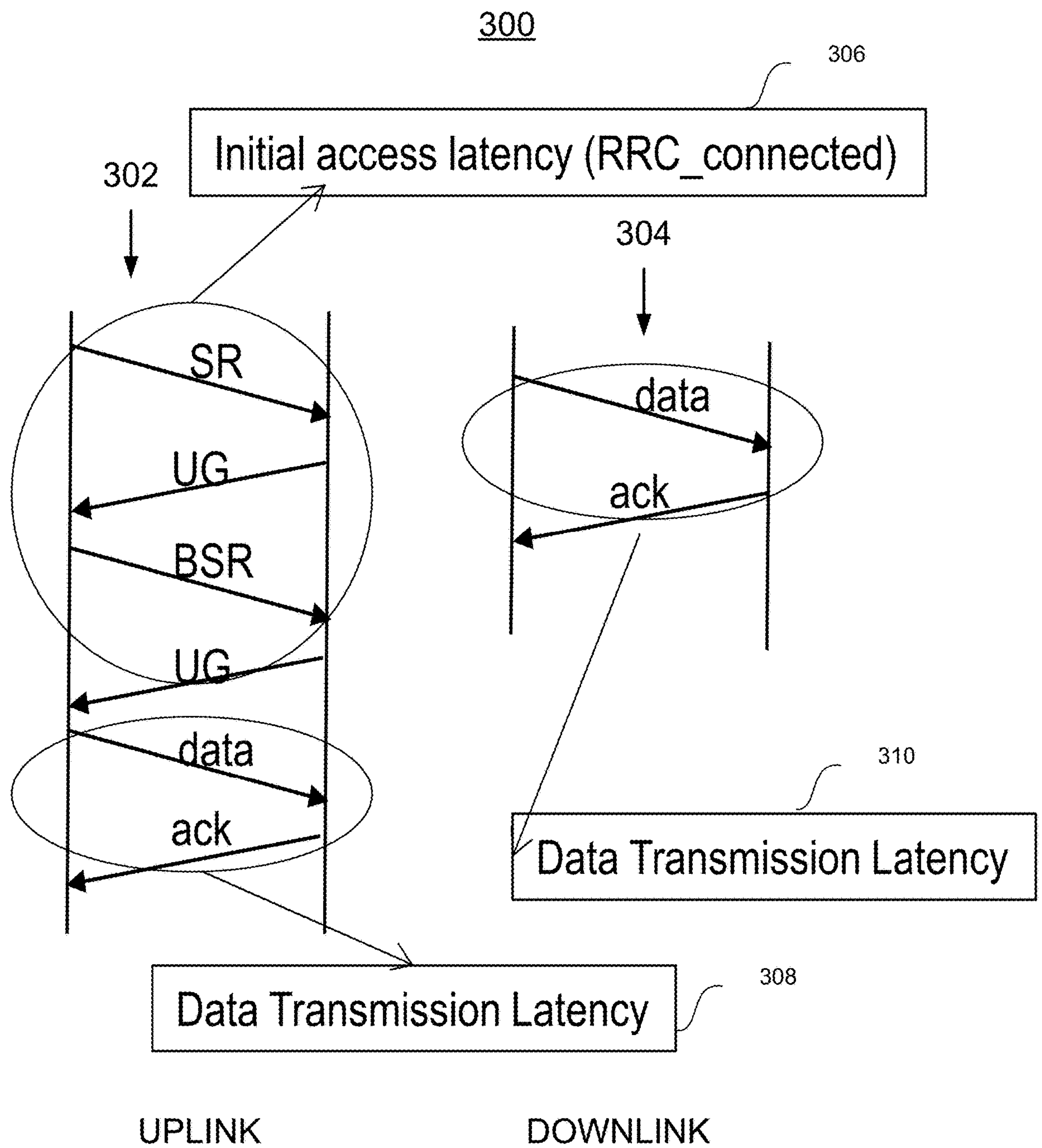
FIG. 3 illustrates a diagram of air interface latency of third generation partnership project (3GPP) long-term evolution (LTE) downlink (DL) transmission and uplink (UL) transmission in accordance with an example.

FIG. 3 illustrates a diagram of air interface latency of third generation partnership project (3GPP) long-term evolution (LTE) downlink (DL) transmission 304 and uplink (UL) transmission 302 in accordance with an example. As depicted, for an uplink operation 302, a UE can be configured to notify the eNodeB that the UE wants to transmit data by sending a Scheduling Request (SR) that can consist of a single bit indicating that the UE needs uplink access. The SR request can be received by eNodeB. The eNodeB can respond with an uplink grant (UG) to communicate the size of a pending buffer. Once the UE receives the first uplink grant UG, the UE can wait for its turn to transmit (up to ~5 ms), and can send a Buffer Status Report (BSR) indicating the amount of data pending in the UE's upload buffers. Finally, the eNodeB can receive the BSR message, allocate the necessary uplink resources, and send back another uplink grant (UG) that can allow the UE to drain the UE's buffer (e.g., transmit the data to the eNodeB). The eNodeB can reply with an acknowledgement (ack) of receiving the data.

In the downlink 304, the eNodeB can transmit data to a UE and the UE can reply to the eNodeB with an ack. As depicted, air interface latency is observed in during 1) "initial access latency" (RRC_connected) 306 and a 2) data transmission latency 308, 310.

Figure 4:
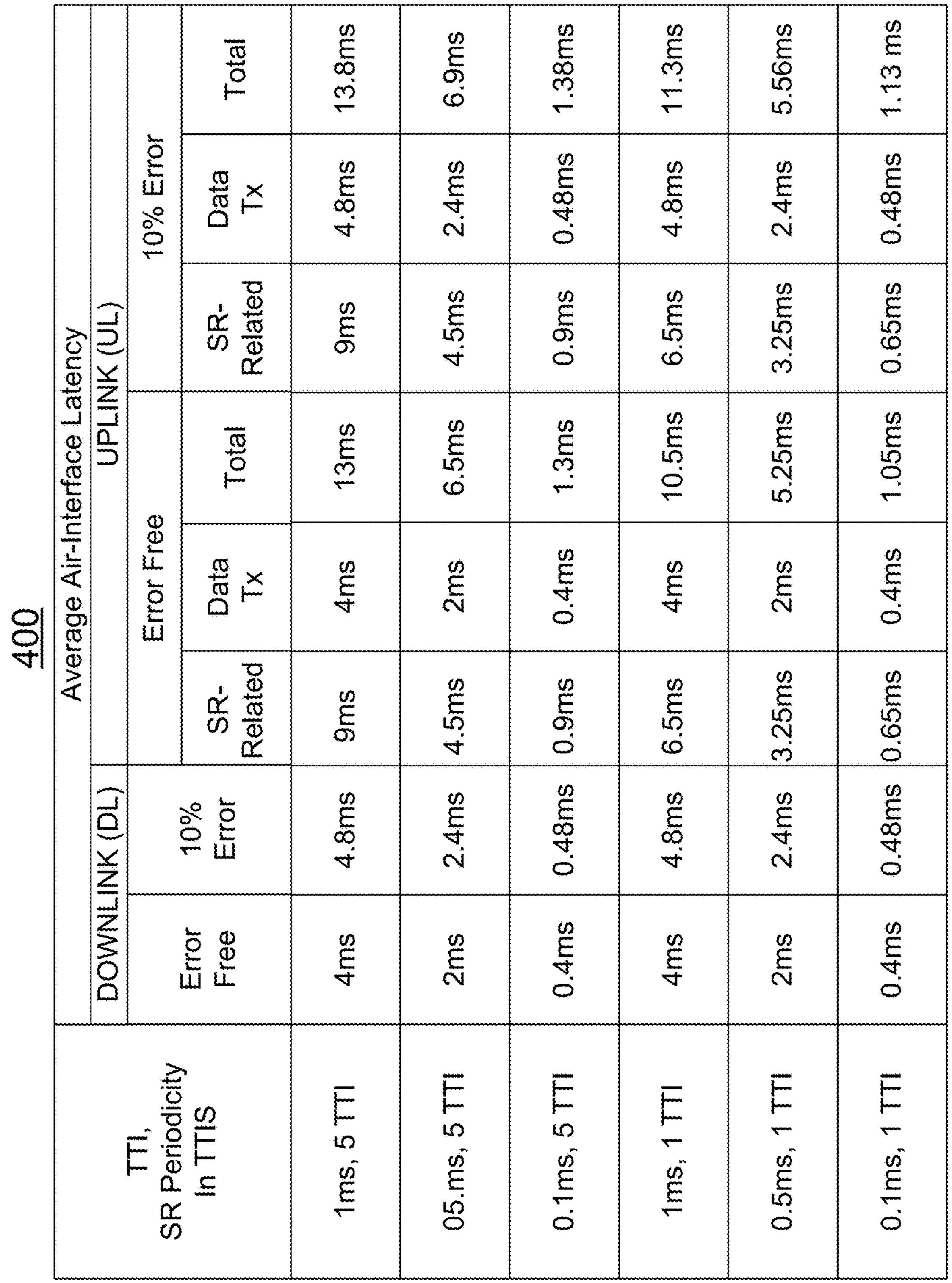
FIG. 4 illustrates a table of average air-interface latency performance improvement derived from reduced transmission time interval (TTI) for both uplink and downlink transmission in accordance with an example.

Turning now to FIG. 4, a table 400 of average air-interface latency performance improvement that is derived from reduced transmission time interval (TTI) for both uplink and downlink transmission is illustrated in accordance with an example. That is, the table 400 depicts the average air-interface latency for UEs in connected mode for uplink and downlink transmission. The SR periodicity of 1 TTI is used for 0.1, 0.5, and 1 ms TTI duration compared to SR periodicity of 5 TTIs used for 0.1, 0.5, and 1 ms TTI duration.

Table 400 depicts the average downlink latency and latency for the UE initiated uplink data transmission for a UE with uplink synchronization. As such, the processing times at the eNB and UE can be reduced by the same factor as the TTI reduction. Two cases for UL and DL HARQ transmissions are illustrated. A first case where no HARQ retransmissions are needed (i.e., error-free), and a second case where it is assumed that there is a 10% error probability for initial transmission and up to 1 HARQ retransmission.

For the UL, the latency due to SR related steps and actual UL data transmission can be separated where it can be assumed that the UE processing time is divided into half for scheduling grant decoding and L1 data encoding.

To be consistent in comparison of DL and UL, the eNB processing delay can be added in the UL after the UL data is received by the eNB. It can be observed from the latency values in Table 400 that the TCP ramp-up performance can be correlated, as expected, to the average air-interface latency. The ramp-up is faster if the air-interface latency is lower.

In addition, the same benefits in terms of TCP slow-start performance can be observed with latency reduction in general, regardless of how the lower latency is achieved. In other words, reduced air-interface latency can 1) assist to achieve higher user perceived throughput even for smaller TCP sessions, and 2) TCP slow-start performance benefits are highly correlated with the UL air-interface latency but independent of the method how the faster UL access is achieved.

It is also observed that SR-related latency in the UL is the dominant factor in average latency values. It is noted that SR-related delay includes delay due to SR periodicity, uplink scheduling delay, and uplink grant transmission. Therefore, one example of the present technology improves the TCP slow-start behavior significantly, which can reduce or completely remove the SR-related delay. In one aspect, a eNB may pre-allocate UL data resources with a small periodicity on shorten TTI (e.g. 2 S-TTI periodicity) in accordance with the UL traffic type of UE. Hence, there is no constraint to send SR/BSR to request UL resources. Consequently, the SR-related delay is reduced to up to a few S-TTIs. In an extreme case, if needed, eNB can configure UL data resources in each S-TTI and the UL delay is reduced to zero.

Figure 5:
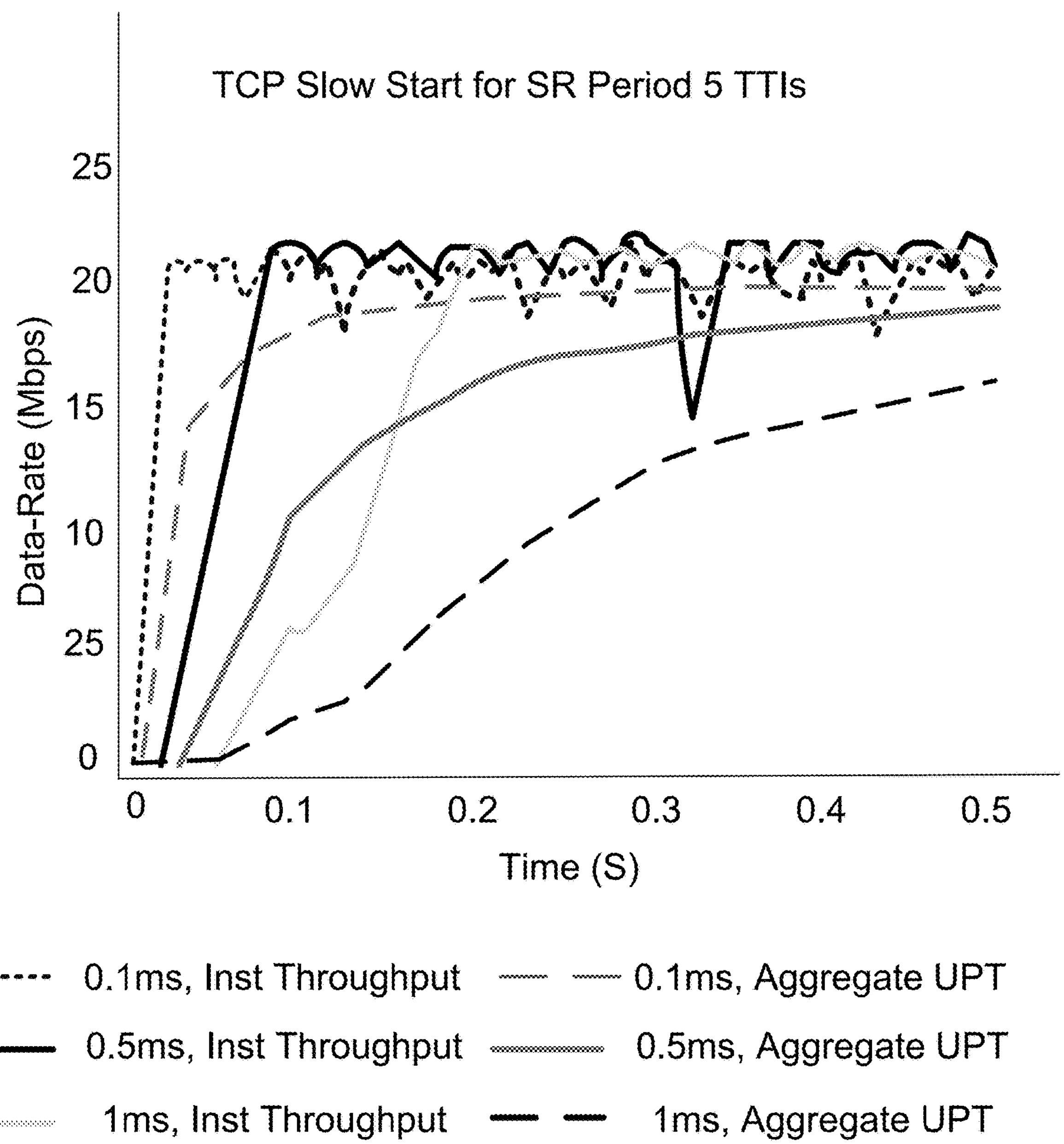
FIG. 5 illustrates a chart of user perceived throughput for various TTI durations in accordance with an example.

In addition, as depicted in the chart 500 of FIG. 5, improvements in user perceived throughput (UPT) for file transfer protocol (FTP) transmissions may be achieved when the TTI is reduced. That is, FIG. 5 depicts a comparison of 1 ms TTI with 0.5 ms and 0.1 ms TTI scenarios. The SR periodicity can be 5 TTI in each case. As expected the TCP ramps up quickly with smaller TTI durations (e.g., 0.1 ms TTI duration) compared to 1 ms TTI. It should be noted that for FIG. 5, it can be assumed that the core network and the Internet delay can be small and can be independent of the TTI values. The assumed latency between eNB and TCP Server can be 1-2 ms and the average DL data-rate can be the same for each different scenario. This can be achieved by scaling the transport block sizes (TBS) according to the duration of TTI compared to the current 1 ms TTI.

File size can be maintained so as to achieve the saturation in data-rate so that the conditions when the UE's perceived instantaneous as well as overall data-rate reaches at least 90% of the saturation rate can be determined. The instantaneous (inst) throughput can be calculated as a 25 ms moving window average of TCP layer throughput. Aggregate user perceived throughput (UPT) can be calculated as total TCP layer data downloaded divided by the time elapsed. Initial time for setting up the network and for the UE to attach to network can be removed as offset from the results such that the FTP request can be sent to the server from the UE at time 0. It should be noted that TCP slow-start is, in general, part of the congestion control mechanism used by TCP and is used in conjunction with other algorithms to avoid network congestion.

Thus, as described herein, the present technology provides for short TTI transmission in LTE to minimize the impact of the slow-start congestion control strategy and ensure coexistence with normal or 3GPP LTE Rel. 12 defined operations (e.g., non-short TTIs) with 1 ms TTI. It should be noted that current LTE operations use a TTI of 1 ms. In one aspect, the present technology provides for short TTI transmission (e.g., 1 symbol TTI, or several OFDM symbol TTI) in LTE that minimizes standard impact and can coexist with 3GPP LTE Rel. 12 defined LTE operation (e.g., 3GPP LTE Rel. 12 operations having 1 ms TTI) in the same frequency band. That is, a short TTI can be defined as a TTI duration shorter than 1 ms TTI duration, such as for example, a 0.1 ms TTI duration or a 0.5 ms TTI duration.

In one aspect, resource allocation can be defined for short TTI. In order to avoid interfering with 3GPP LTE Rel. 12 defined LTE operations (e.g., LTE operations having 1 ms TTI duration), the short TTI resource allocation can be constrained to use only physical downlink shared channel (PDSCH) and physical uplink share channel (PUSCH) resources. All other resources used by 3GPP LTE Rel. 12 defined LTE operation (e.g., LTE operations having 1 ms TTI) can be protected. That is, all other resourced may not be used by short TTI transmission.

In one aspect, the present technology defines resource allocation for short TTI. In one aspect, the short TTI can be reduced to a duration as short as one symbol. The short TTI resources can be allocated either semi-statically by RRC message or dynamically by means of DCI format on PDCCH. Adaptive TTI concepts can be used to accommodate an eNodeB scheduling demand in a flexible manner.

In addition, a processing time, such as a processing time of 3 ms, or another desired processing period of time, can be used prior to the data being made available to upper layers. In one aspect, the short TTI can reduce processing time in a linear fashion. Therefore, reducing the short TTI duration to one symbol can reduce one-way transmission delay from 4 ms to 0.28 microseconds (μs), and the round trip delay for hybrid automatic repeat request (HARQ) feedback from 8 ms to 0.57 μs.

In one aspect, the one or more design principles can be applied for reducing the air interface latency using a short TTI. In one aspect, short TTI transmission can include the follow. 1) Orthogonal frequency multiple access (OFDMA) and/or single carrier frequency division multiple access (SC-FDMA) parameters are constrained from being modified to preserve orthogonality between short TTI and 3GPP LTE Rel. 12 defined transmission(s). Sub-carrier spacing, OFDM symbol duration, and cyclic prefix duration, among others, are not changed. As a result, no guard bands or guard periods are necessary. Short TTI transmission can coexist with 3GPP LTE Rel. 12 defined LTE transmissions (e.g., LTE transmission of 1 ms TTI duration) in a given frequency band. 3GPP LTE Rel. 12 defined LTE transmission (e.g., LTE transmission of 1 ms TTI duration) can be protected for backward compatibility. Some functions of short TTI transmission can utilize 3GPP LTE Rel. 12 defined LTE physical channels, while others can use the definition of new channels, such as short channels. The short TTI duration can be specified as one or several OFDM symbols. For example, a Primary synchronization signal (PSS) and Secondary synchronization signal (SSS), physical channels used to transmit broadcasted signaling (e.g. System information, Paging information, etc.) can be maintained for S-TTI operation. The short TTI duration can be specified as one or several symbols (e.g., OFDM symbols) Preferably, an integer number of short TTI can fit a 3GPP LTE Rel. 12 defined LTE sub-frame. The short TTI can be used for downlink transmission, uplink transmission, or both.

In one aspect, the short TTI can have a defined frame structure. The short TTI transmission can take place over a subset of resources available for 3GPP LTE Rel. 12 defined LTE PDSCH and PUSCH (e.g., 3GPP LTE Rel. 12 defined PDSCH and PUSCH of LTE operations having 1 ms TTI duration). The subset of resources can constitute a short TTI resource block (RB) set. In one embodiment, a 3GPP LTE Rel. 12 defined TTI (e.g., 3GPP LTE Rel. 12 defined TTI operations having 1 ms TTI duration) and short TTI transmission can be multiplexed in frequency division multiplexing (FDM) fashion, as described in FIG. 6.

FIG. 6 illustrates a diagram of multiplexing short TTI and 3GPP LTE TTI in a subframe for downlink (DL) and uplink (UL) transmission in accordance with an example. FIG. 6 depicts FDM multiplexing of 3GPP LTE Rel. 12 defined TTI (e.g., 1 ms TTI duration) and short TTI (e.g., less than 1 ms TTI duration). In one aspect, both control and data regions can be indicated within a short TTI. In one aspect, downlink allocation of 3GPP LTE Rel. 12 defined TTI and short TTI can be interleaved in frequency to maximize frequency diversity, while uplink allocation of 3GPP LTE Rel. 12 defined TTI and short TTI may be designated as continuous frequency regions, in order to maximize contiguous RB allocations to the user equipment (UE).

In one aspect, several resource partitions between 3GPP LTE Rel. 12 defined TTI and short TTI can be provided. In one aspect, the present technology provides for frequency division based partition where, within a subframe, for example, a number of resource blocks can be designated for short TTI transmission. In another aspect, the present technology provides for time division based partition, where one subframe can be designated for 3GPP LTE Rel. 12 defined TTI and a different subframe can be designated for short TTI.

More specifically, in some aspects, one subframe indicated as UL subframe by higher layer signaling (e.g. SIB1) for UEs of 3GPP LTE defined Rel-13, and/or earlier 3GPP LTE defined releases, may be dynamically indicated as a new frame type, wherein DL transmission on one or more S-TTIs may occur for UE's (such as 3GPP LTE defined Rel-14 UEs) configured with shortening TTI operation. It is also possible that partial of this new subframe type may be used for UL transmission on S-PUCCH or S-PUSCH. In a further aspect, the present technology provides for both time and frequency division based partition, here at each subframe, a number of resource blocks can be designated for short TTI and the designation changes from one subframe to the other. In order to avoid impact on the operation of 3GPP LTE Rel. 12 defined TTI, a number of resource elements (RE) within a sub-frame are designated as protected RE.

In one aspect, the short TTI transmission can be constrained from using protected REs regardless of a designated resource allocation. Protected REs can include those occupied by one or more channels and signals: For example, in a Downlink operation, protected REs can include physical control format indicator channel (PCFICH), physical downlink control channel (PDCCH), physical HARQ indicator channel (PHICH); cell-specific reference signal (CRS); primary synchronization signal (PSS)/secondary synchronization signal (SSS); physical broadcast channel (PBCH); and/or system information block (SIB) transmissions. In the uplink operation, protected REs can include physical uplink control channel (PUCCH) and/or sounding reference signal (SRS).

By way of operation, a UE can be configured to support short TTI transmission/reception and communicate using both 3GPP LTE Rel. 12 defined TTI and short TTI transmission/reception. To determine a resource allocation, the UE can monitor both the 3GPP LTE Rel. 12 defined TTI and short TTI control regions.

In one aspect, the UE can be constrained to use only either normal or short TTI on a defined or selected subframe. In so doing, the UE implementation can be simplified. For example, in a downlink operation, only one transport block (TB) can be received. In one aspect, if a UE detects resource allocation in a 3GPP LTE Rel. 12 defined LTE mode, the UE can forego monitoring a short TTI control region. In the uplink operation, as described in FIG. 7, a scheduler can ensure that a UE can be allocated contiguous resources in the frequency domain, simplifying the implementation of the power amplifier.

Figure 7:
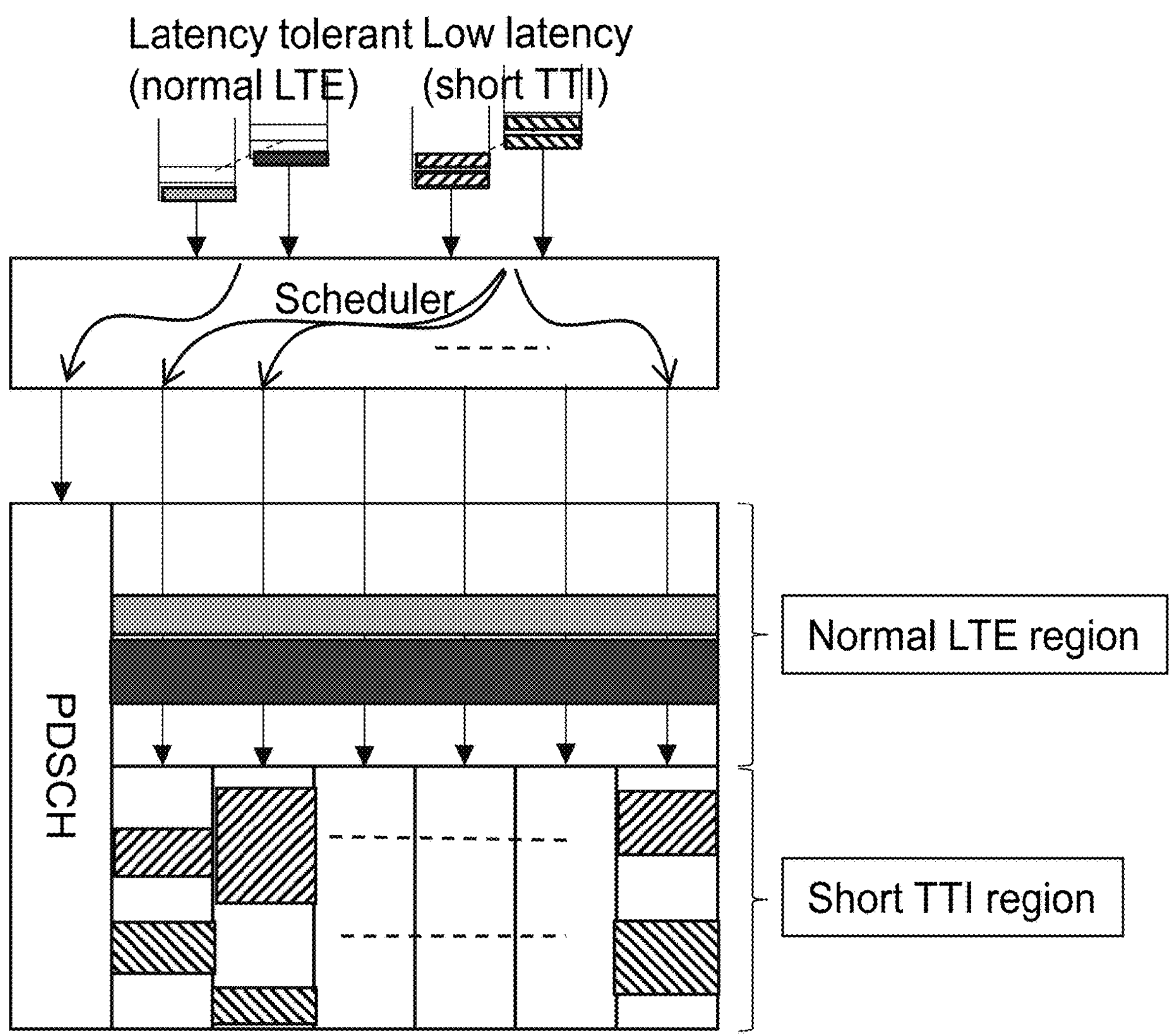
FIG. 7 illustrates a diagram of operations for short TTI and 3GPP LTE Rel. 12 defined TTI in accordance with an example.

FIG. 7 illustrates a diagram of operations for short TTI and 3GPP LTE Rel. 12 defined TTI transmissions. In one aspect, the UE can utilize both 3GPP LTE Rel. 12 defined TTI and short TTI transmission/reception in a given subframe. The scheduler can allocate 3GPP LTE Rel. 12 defined LTE resources to one or more latency tolerant UEs and/or one or more legacy UEs and can use a legacy PDCCH to signal the allocation. The short TTI resources can allocated to low latency traffic, and the resource allocation can be signaled using the short TTI control region.

In one aspect, a UE capable of short TTI operation can determine a short TTI RB set in order to monitor the short TTI control region. The TTI resource block (RB) set can be static (i.e., the same RE can be allocated in every subframe) or dynamic. In one aspect, the UE can assume a maximum RB allocation for short TTI and blindly detect its resource allocation from the short TTI control region.

In one aspect, the UE can blindly determine the short TTI RB set from a small number of candidates, using modulation or signal properties. For example, in 3GPP LTE Rel. 12 defined TTI the modulation order is not expected to change for different OFDM symbols, while the modulation order can change for different OFDM symbols using short TTI transmission.

In one aspect, the eNB can indicate the short TTI RB set. In one aspect, the eNB can indicate the short TTI RB set using the PDCCH, where a selected bit word or a specific radio network temporary identifier (RNTI) can be used to mask a control channel element containing the resource allocation (downlink control information (DCI)) for the short TTI RB set; and/or use upper layer signaling to indicate the short TTI RB set.

Figure 8:
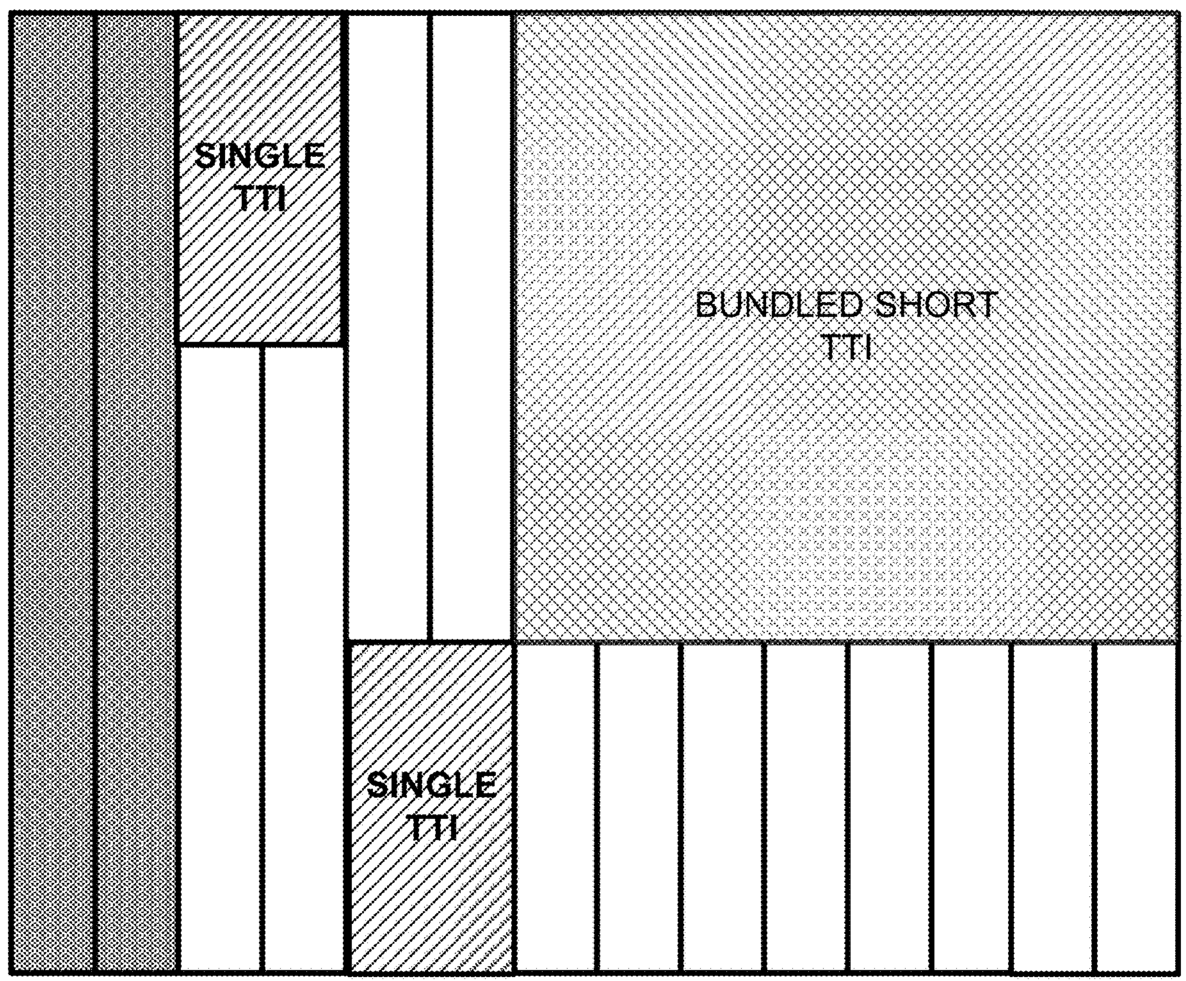
FIG. 8 illustrates a diagram of bundling one or more short TTI in accordance with an example.

In one aspect, the short TTI can be adaptive. For example, while short TTI transmission minimizes air interface latency, in some cases, utilizing a longer TTI can support larger transport block sizes, which can reduce overhead and maximize channel code performance. In one aspect, two or more short TTIs can be bundled (or the longer TTI can be used), as depicted in FIG. 8. Bundling one or more short TTI can allow more RE to become available, and larger TB sizes can be supported. In one aspect, a fixed number of short TTIs can be bundled together. Several bundling options can be provided, such as, for example, 1, 2, 6, or 12 symbols in the downlink, and/or 1, 2, 7, or 14 symbols in the uplink. In another aspect, the resource allocation can indicate whether a short TTI can be used and/or a long TTI can be used. In the latter case, all or most resources until the end of the LTE legacy subframe can be used. It should be noted that the short TTI size can depend on the position where the short TTI has been scheduled.

As depicted in FIG. 8, a UE can be scheduled for a short TTI for the first two TTI intervals (e.g., 3GPP LTE Rel. 12 defined TTI having a 1 ms TTI duration). Then, the UE can be assigned a long TTI, or said differently, a "bundled short TTI" for the remainder of the subframe. FIG. 8 can be based on the current LTE assumption that in a TTI, a single PDSCH can be received by the UE. In one aspect, a downlink control information DCI field can be provided in order to dynamically signal TTI bundling to the UE.

Another example provides functionality 900 of a user equipment (UE) operable to perform reduced transmission time interval (TTI) data transmission within a wireless communication network, as shown in the flow chart in FIG. 9. The functionality 900 can be implemented as a method or the functionality can be executed as instructions on a machine, where the instructions are included one or more computer readable mediums or one or more non-transitory machine readable storage mediums. The UE can comprise one or more processors and memory configured to: process, for transmission to an eNodeB, control information within a short transmission time interval (TTI) over a short TTI resource block (RB) set within a short physical uplink control channel (S-PUCCH), wherein the short TTI is shorter in time than a 1 millisecond (ms) TTI, such as a third generation partnership project (3GPP) long-term evolution (LTE) Rel. 12 defined TTI, and wherein the S-PUCCH is a subset of resources available for a short physical uplink shared channel (S-PUSCH) and the S-PUSCH is a subset of resources available for a 3GPP LTE Rel. 12 defined PUSCH transmission, as in block 910. The UE can comprise one or more processors and memory configured to: process, for transmission to the eNodeB, data within the short TTI over the short TTI RB set within the S-PUSCH, as in block 920.

Another example provides functionality 1000 of an eNodeB operable to perform reduced transmission time interval (TTI) data transmission within a wireless communication network, as shown in the flow chart in FIG. 10. The functionality 1000 can be implemented as a method or the functionality can be executed as instructions on a machine, where the instructions are included one or more computer readable mediums or one or more non-transitory machine readable storage mediums. The eNodeB can comprise one or more processors and memory configured to: process, for transmission to a UE, control information within a short transmission time interval (TTI) over a short TTI resource block (RB) set within a short physical downlink control channel (S-PDCCH), wherein the short TTI is shorter in time than a 1 millisecond (ms) TTI, such as a third generation partnership project (3GPP) long-term evolution (LTE) Rel. 12 defined TTI, and wherein the S-PDCCH is a subset of resources available for a short physical downlink shared channel (S-PDSCH) and the S-PDSCH is a subset of resources available for a PDSCH transmission (e.g., a 3GPP LTE Rel. 12 defined PDSCH transmission), as in block 1010. The eNodeB can comprise one or more processors and memory configured to: process, for transmission to the UE, data within the short TTI over the short TTI RB set within the S-PDSCH, as in block 1020.

In one aspect, the functionality 1000 can include one or more of the following. In one aspect, the short TTI can be equal to or less than 1 millisecond (ms) or equal to or less than 0.5 ms. In one aspect, the short TTI is defined as equal to one or more orthogonal frequency multiple access (OFDMA) symbols.

Another example provides functionality 1100 of an eNodeB operable to perform short transmission time interval (TTI) data transmission with a user equipment (UE), as shown in the flow chart in FIG. 11. The functionality 1100 can be implemented as a method or the functionality can be executed as instructions on a machine, where the instructions are included one or more computer readable mediums or one or more non-transitory machine readable storage mediums. The eNodeB can comprise one or more processors and memory configured to: define, for the short TTI, a short TTI resource block (RB) set from resources allocated for third generation partnership project (3GPP) long-term evolution (LTE) transmissions according to a frequency division or time division for uplink transmission or downlink transmission, as in block 1110. The eNodeB can comprise one or more processors and memory configured to: define resources allocated for the 3GPP LTE transmission that are protected from being used for the short TTI to prevent interference between data being transmitted using the 3GPP LTE transmission protocols and data being transmitted using the short TTI, as in block 1120. The eNodeB can comprise one or more processors and memory configured to: process data, received from the UE, according to the short TTI over the short TTI RB set within a physical downlink control channel (PDSCH), wherein the short TTI is shorter in time than the 3GPP LTE TTI, and the short TTI RB set is a subset of resources available for PDSCH transmissions, as in block 1130. The eNodeB can comprise one or more processors and memory configured to: process, for transmission to the UE, according to the short TTI over another short TTI RB set within a physical uplink control channel (PUSCH), wherein the other short TTI RB set is a subset of resources available for PUSCH transmissions, as in block 1140.

Figure 12:
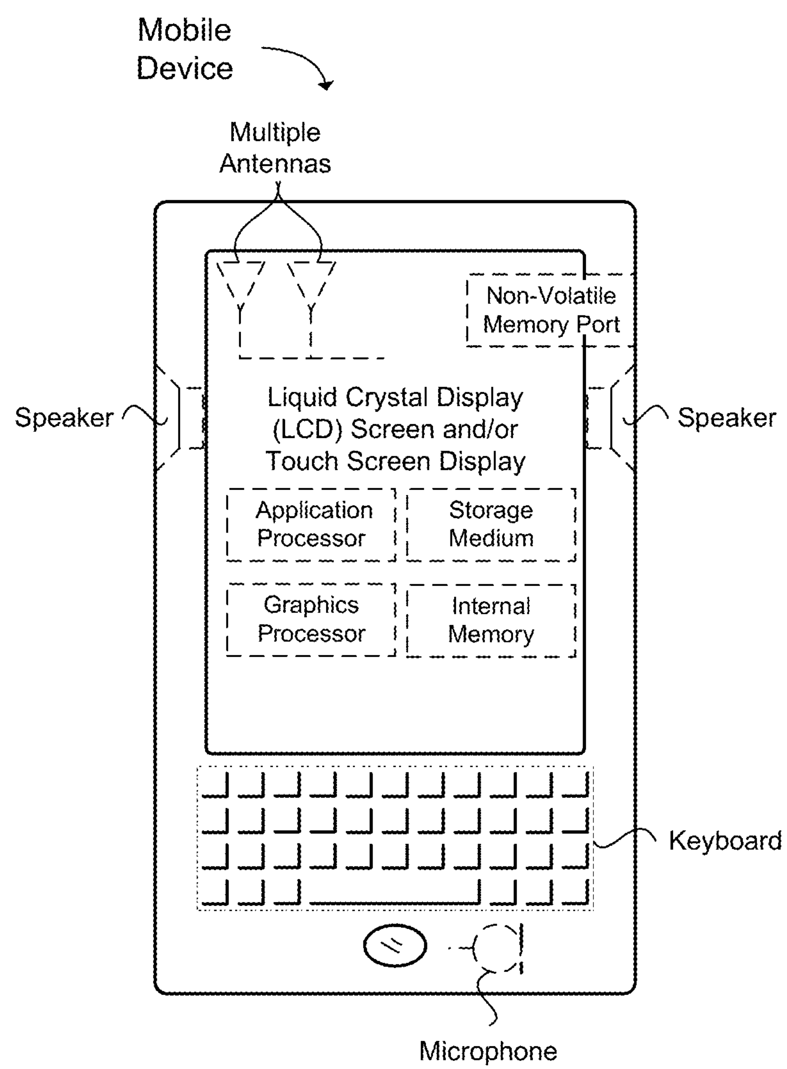
FIG. 12 illustrates a diagram of example components of a wireless device (e.g. User Equipment "UE") device in accordance with an example.

FIG. 12 illustrates a diagram of a wireless device (e.g., UE) in accordance with an example. FIG. 12 provides an example illustration of the wireless device, such as a user equipment (UE), a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 13:
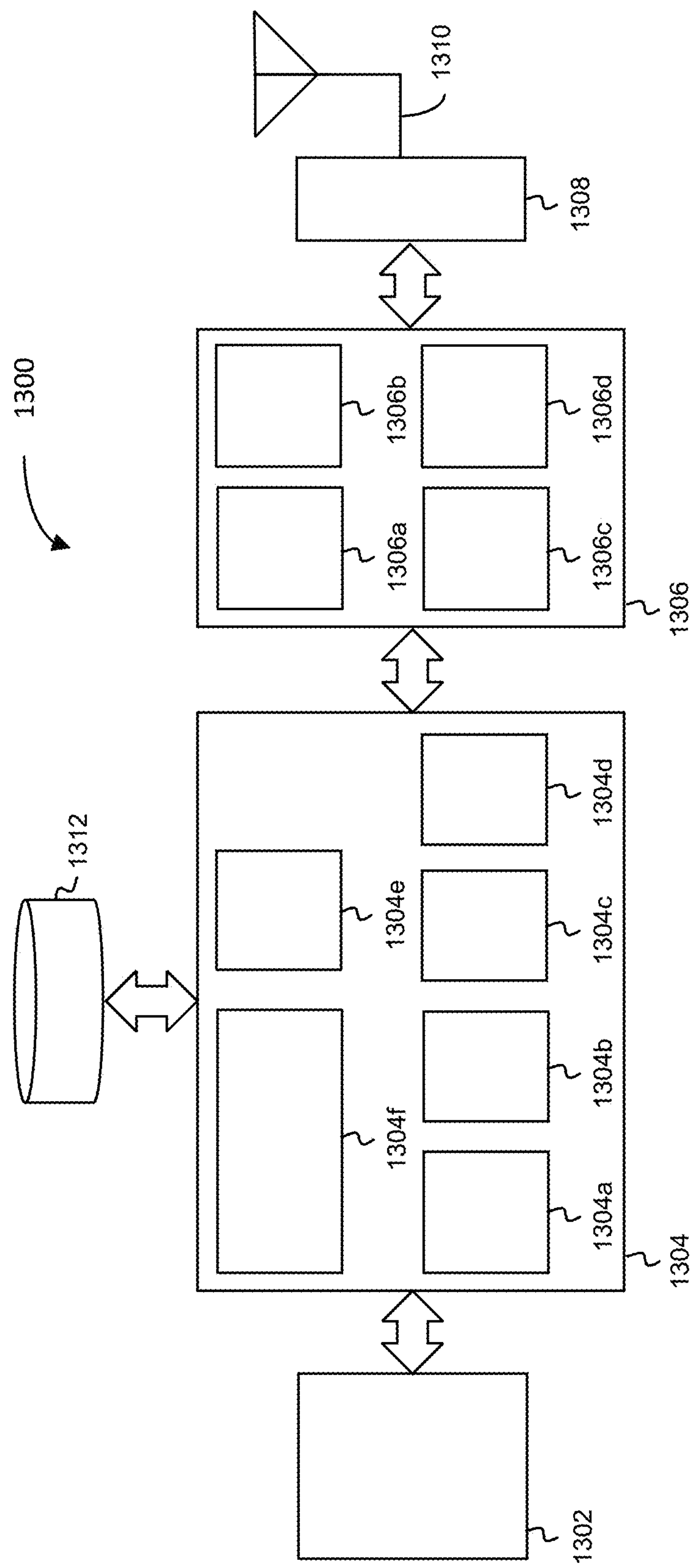
FIG. 13 illustrates a diagram of example components of a User Equipment (UE) device in accordance with an example.

FIG. 13 illustrates a diagram of example components of a User Equipment (UE) device in accordance with an example. FIG. 13 illustrates, for one aspect, example components of a User Equipment (UE) device 1300. In some aspects, the UE device 1300 can include application circuitry 1302, baseband circuitry 1304, Radio Frequency (RF) circuitry 1306, front-end module (FEM) circuitry 1308 and one or more antennas 1310, coupled together at least as shown.

The application circuitry 1302 can include one or more application processors. For example, the application circuitry 1302 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 1312, and can be configured to execute instructions stored in the storage medium 1312 to enable various applications and/or operating systems to run on the system.

The baseband circuitry 1304 can include circuitry such as, but not limited to, one or more single-core or multi-core processors. The baseband circuitry 1304 can include one or more baseband processors and/or control logic to process baseband signals received from a receive signal path of the RF circuitry 1306 and to generate baseband signals for a transmit signal path of the RF circuitry 1306. Baseband processing circuitry 1304 can interface with the application circuitry 1302 for generation and processing of the baseband signals and for controlling operations of the RF circuitry 1306. For example, in some aspects, the baseband circuitry 1304 can include a second generation (2G) baseband processor 1304*a*, third generation (3G) baseband processor 1304*b*, fourth generation (4G) baseband processor 1304*c*, and/or other baseband processor(s) 1304*d* for other existing generations, generations in development or to be developed in the future (e.g., fifth generation (5G), 6G, etc.). The baseband circuitry 1304 (e.g., one or more of baseband processors 1304*a-d*) can handle various radio control functions that enable communication with one or more radio networks via the RF circuitry 1306. The radio control functions can include, but are not limited to, signal modulation/demodulation, encoding/decoding, radio frequency shifting, etc. In some aspects, modulation/demodulation circuitry of the baseband circuitry 1304 can include Fast-Fourier Transform (FFT), precoding, and/or constellation mapping/demapping functionality. In some aspects, encoding/decoding circuitry of the baseband circuitry 1304 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1304 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304*e* of the baseband circuitry 1304 can be configured to run elements of the protocol stack for signaling of the PHY, MAC, RLC, PDCP and/or RRC layers. In some aspects, the baseband circuitry can include one or more audio digital signal processor(s) (DSP) 1304*f* The audio DSP(s) 1304*f* can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1304 and the application circuitry 1302 can be implemented together such as, for example, on a system on a chip (SOC).

In some aspects, the baseband circuitry 1304 can provide for communication compatible with one or more radio technologies. For example, in some aspects, the baseband circuitry 1304 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1304 is configured to support radio communications of more than one wireless protocol can be referred to as multi-mode baseband circuitry.

RF circuitry 1306 can enable communication with wireless networks using modulated electromagnetic radiation through a non-solid medium. In various aspects, the RF circuitry 1306 can include switches, filters, amplifiers, etc. to facilitate the communication with the wireless network. RF circuitry 1306 can include a receive signal path which can include circuitry to down-convert RF signals received from the FEM circuitry 1308 and provide baseband signals to the baseband circuitry 1304. RF circuitry 1306 can also include a transmit signal path which can include circuitry to up-convert baseband signals provided by the baseband circuitry 1304 and provide RF output signals to the FEM circuitry 1308 for transmission.

In some aspects, the RF circuitry 1306 can include a receive signal path and a transmit signal path. The receive signal path of the RF circuitry 1306 can include mixer circuitry 1306*a*, amplifier circuitry 1306*b* and filter circuitry 1306*c*. The transmit signal path of the RF circuitry 1306 can include filter circuitry 1306*c* and mixer circuitry 1306*a*. RF circuitry 1306 can also include synthesizer circuitry 1306*d* for synthesizing a frequency for use by the mixer circuitry 1306*a* of the receive signal path and the transmit signal path. In some aspects, the mixer circuitry 1306*a* of the receive signal path can be configured to down-convert RF signals received from the FEM circuitry 1308 based on the synthesized frequency provided by synthesizer circuitry 1306*d*. The amplifier circuitry 1306*b* can be configured to amplify the down-converted signals and the filter circuitry 1306*c* can be a low-pass filter (LPF) or band-pass filter (BPF) configured to remove unwanted signals from the down-converted signals to generate output baseband signals. Output baseband signals can be provided to the baseband circuitry 1304 for further processing. In some aspects, the output baseband signals can be zero-frequency baseband signals, although the output baseband signals do not have to be zero-frequency baseband signals. In some aspects, mixer circuitry 1306*a* of the receive signal path can comprise passive mixers, although the scope of the aspects is not limited in this respect.

In some aspects, the mixer circuitry 1306*a* of the transmit signal path can be configured to up-convert input baseband signals based on the synthesized frequency provided by the synthesizer circuitry 1306*d* to generate RF output signals for the FEM circuitry 1308. The baseband signals can be provided by the baseband circuitry 1304 and can be filtered by filter circuitry 1306*c*. The filter circuitry 1306*c* can include a low-pass filter (LPF), although the scope of the aspects is not limited in this respect.

In some aspects, the mixer circuitry 1306*a* of the receive signal path and the mixer circuitry 1306*a* of the transmit signal path can include two or more mixers and can be arranged for quadrature downconversion and/or upconversion respectively. In some aspects, the mixer circuitry 1306*a* of the receive signal path and the mixer circuitry 1306*a* of the transmit signal path can include two or more mixers and can be arranged for image rejection (e.g., Hartley image rejection). In some aspects, the mixer circuitry 1306*a* of the receive signal path and the mixer circuitry 1306*a* can be arranged for direct downconversion and/or direct upconversion, respectively. In some aspects, the mixer circuitry 1306*a* of the receive signal path and the mixer circuitry 1306*a* of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1306 can include analog-to-digital converter (ADC) and digital-to-analog converter (DAC) circuitry and the baseband circuitry 1304 can include a digital baseband interface to communicate with the RF circuitry 1306.

In some dual-mode embodiments, a separate radio IC circuitry can be provided for processing signals for each spectrum, although the scope of the embodiments is not limited in this respect.

In some embodiments, the synthesizer circuitry 1306*d* can be a fractional-N synthesizer or a fractional N/N+1 synthesizer, although the scope of the embodiments is not limited in this respect as other types of frequency synthesizers can be suitable. For example, synthesizer circuitry 1306*d* can be a delta-sigma synthesizer, a frequency multiplier, or a synthesizer comprising a phase-locked loop with a frequency divider.

The synthesizer circuitry 1306*d* can be configured to synthesize an output frequency for use by the mixer circuitry 1306*a* of the RF circuitry 1306 based on a frequency input and a divider control input. In some embodiments, the synthesizer circuitry 1306*d* can be a fractional N/N+1 synthesizer.

In some embodiments, frequency input can be provided by a voltage controlled oscillator (VCO), although that is not a constraint. Divider control input can be provided by either the baseband circuitry 1304 or the application circuitry 1302 depending on the desired output frequency. In some embodiments, a divider control input (e.g., N) can be determined from a look-up table based on a channel indicated by the application circuitry 1302.

Synthesizer circuitry 1306*d* of the RF circuitry 1306 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1306 can include an IQ/polar converter.

FEM circuitry 1308 can include a receive signal path which can include circuitry configured to operate on RF signals received from one or more antennas 1310, amplify the received signals and provide the amplified versions of the received signals to the RF circuitry 1306 for further processing. FEM circuitry 1308 can also include a transmit signal path which can include circuitry configured to amplify signals for transmission provided by the RF circuitry 1306 for transmission by one or more of the one or more antennas 1310.

In some embodiments, the FEM circuitry 1308 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1306). The transmit signal path of the FEM circuitry 1308 can include a power amplifier (PA) to amplify input RF signals (e.g., provided by RF circuitry 1306), and one or more filters to generate RF signals for subsequent transmission (e.g., by one or more of the one or more antennas 1310.

In some embodiments, the UE device 1300 can include additional elements such as, for example, memory/storage, display, camera, sensor, and/or input/output (I/O) interface.

Figure 14:
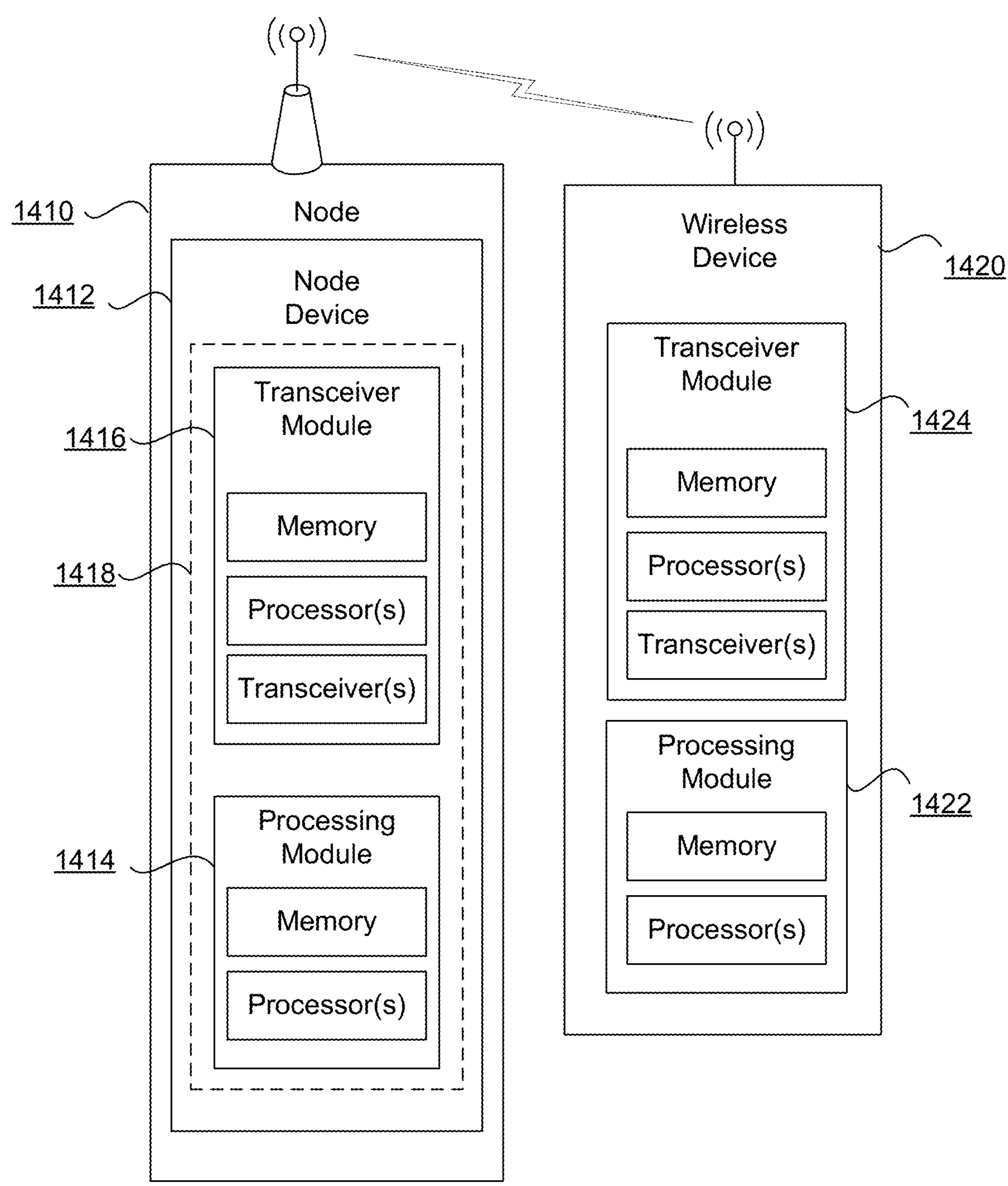
FIG. 14 illustrates a diagram of a node (e.g., eNB) and wireless device (e.g., UE) in accordance with an example.

FIG. 14 illustrates a diagram 1400 of a node 1410 (e.g., eNB and/or a base station) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1410 can include a node device 1412. The node device 1412 or the node 1410 can be configured to communicate with the wireless device 1420. The node device 1412 can be configured to implement the technology described. The node device 1412 can include a processing module 1414 and a transceiver module 1416. In one aspect, the node device 1412 can include the transceiver module 1416 and the processing module 1414 forming a circuitry 1418 for the node 1410. In one aspect, the transceiver module 1416 and the processing module 1414 can form a circuitry of the node device 1412. The processing module 1414 can include one or more processors and memory. In one embodiment, the processing module 1422 can include one or more application processors. The transceiver module 1416 can include a transceiver and one or more processors and memory. In one embodiment, the transceiver module 1416 can include a baseband processor.

The wireless device 1420 can include a transceiver module 1424 and a processing module 1422. The processing module 1422 can include one or more processors and memory. In one embodiment, the processing module 1422 can include one or more application processors. The transceiver module 1424 can include a transceiver and one or more processors and memory. In one embodiment, the transceiver module 1424 can include a baseband processor. The wireless device 1420 can be configured to implement the technology described. The node 1410 and the wireless devices 1420 can also include one or more storage mediums, such as the transceiver module 1416, 1424 and/or the processing module 1414, 1422. In one aspect, the components described herein of the transceiver module 1416 can be included in one or more separate devices that may be used in a cloud-RAN (C-RAN) environment.

EXAMPLES

The following examples pertain to specific invention embodiments and point out specific features, elements, or steps that can be used or otherwise combined in achieving such embodiments.

Example 1 includes an apparatus of a user equipment (UE), the UE configured to perform short transmission time interval (TTI) data transmission, the apparatus comprising one or more processors and memory configured to: process, for transmission to an eNodeB, control information within a short transmission time interval (TTI) over a short TTI resource block (RB) set within a short physical uplink control channel (S-PUCCH), wherein the short TTI is shorter in time than a legacy TTI that has a duration of at least one (1) millisecond, and wherein the S-PUCCH is a subset of resources available for a short physical uplink shared channel (S-PUSCH) and the S-PUSCH is a subset of resources available for a PUSCH transmission; and process, for transmission to the eNodeB, data within the short TTI over the short TTI RB set within the S-PUSCH.

Example 2 includes the apparatus of example 1, wherein the short TTI RB set are semi-statically or dynamically allocated.

Example 3 includes the apparatus of example 1 or 2, wherein the one or more processors and memory are further configured to accommodate eNodeB scheduling for the short TTI.

Example 4 includes the apparatus of example 1, wherein the one or more processors and memory are further configured to process, for uplink transmission to or downlink transmission from an eNodeB, the data communicated on the short TTI RB set allocated for the short TTI that is equal to or less than one (1) millisecond (ms) in a same frequency of alternative data being transmitted using the legacy TTI.

Example 5 includes the apparatus of example 1, wherein the short TTI is defined as less than one (1) millisecond (ms).

Example 6 includes the apparatus of example 1, wherein the short TTI is defined as equal to one or more orthogonal frequency multiple access (OFDMA) symbols.

Example 7 includes the apparatus of example 1 or 4, wherein the one or more processors and memory are further configured to detect control regions and data regions in the short TTI RB set allocated for the short TTI.

Example 8 includes the apparatus of example 1 or 7, wherein the one or more processors and memory are further configured to monitor a control region in the short TTI RB set allocated for the short TTI.

Example 9 includes the apparatus of example 1 or 5, wherein the one or more processors and memory are further configured to blindly detect the short TTI RB set allocated for the short TTI.

Example 10 includes the apparatus of example 1, wherein the one or more processors and memory are further configured to multiplex data transmissions using the legacy TTI and data transmissions using the short TTI.

Example 11 includes the apparatus of example 1, wherein the one or more processors and memory are further configured to use the short TTI or the legacy TTI for a selected subframe.

Example 12 includes the apparatus of example 1, wherein the short TTI RB set allocated for the short TTI is signaled from the eNodeB by upper layer signaling.

Example 13 includes the apparatus of example 1 or 12, wherein the short TTI RB set allocated for the short TTI is signaled using the legacy physical downlink control channel (PDCCH) masked with a specific radio network temporary identifier (RNTI).

Example 14 includes the apparatus of example 1, wherein the one or more processors and memory are further configured to: generate a bundled short TTI by bundling one or more short TTI; or use a defined downlink control information (DCI) format in the short TTI control region to determine a number of the bundled short TTI.

Example 15 includes the apparatus of example 1, wherein the apparatus includes at least one of an antenna, a touch sensitive display screen, a speaker, a microphone, a graphics processor, an application processor, a baseband processor, an internal memory, a non-volatile memory port, and combinations thereof.

Example 16 includes the apparatus of example 1 or 15, wherein the control information and the data are processed for transmission using a baseband processor.

Example 17 includes apparatus of an eNodeB, the eNodeB configured to perform short transmission time interval (TTI) data transmission with a User Equipment (UE), the apparatus comprising one or more processors and memory configured to: process, for transmission to a UE, control information within a short transmission time interval (TTI) over a short TTI resource block (RB) set within a short physical downlink control channel (S-PDCCH), wherein the short TTI is shorter in time than a legacy TTI that has a duration of at least one (1) millisecond, and wherein the S-PDCCH is a subset of resources available for a short physical downlink shared channel (S-PDSCH) and the S-PDSCH is a subset of resources available for a PDSCH transmission; and process, for transmission to the UE, data within the short TTI over the short TTI RB set within the S-PDSCH.

Example 18 includes the apparatus of example 17, wherein the short TTI is less than 1 millisecond (ms) or equal to or less than 0.5 ms.

Example 19 includes the apparatus of example 17, wherein the short TTI is defined as equal to one or more orthogonal frequency multiple access (OFDMA) symbols.

Example 20 includes the apparatus of example 17, wherein the one or more processors and memory are further configured to multiplex data of the legacy TTI and data of the short TTI using frequency division multiplexing (FDM).

Example 21 includes the apparatus of example 17, wherein the one or more processors and memory are further configured to interleave frequency regions of the TTI and the short TTI for a downlink while designating the legacy TTI and the short TTI as a continuous frequency region for an uplink.

Example 22 includes the apparatus of example 17 or 18, wherein the one or more processors and memory are further configured to: use the short TTI in a selected subframe for transmitting data to or receiving data from the UE; use the legacy TTI and the short TTI for transmitting data to or receiving data from the UE in a selected subframe; transmit data in the short TTI using only one transport block (TB); schedule a contiguous set of the short TTI RB set in a frequency domain for transmitting data in the short TTI; and/or schedule data, for transmission to the UE, according to the short TTI over the another short TTI RB set within the PUCCH, wherein the other short TTI RB set is the subset of resources available for PUSCH transmissions.

Example 23 includes the apparatus of example 17, wherein the one or more processors and memory are further configured to determine the short TTI RB set in order to monitor a short TTI control region, wherein the short TTI RB set is scheduled according to static scheduling, wherein the short TTI RB set is located in a same one or more resource elements (REs) in each subframe, or the short TTI RB set is scheduled according to dynamic scheduling, wherein the short TTI RB set is located in different one or more resource elements (REs) in every subframe.

Example 24 includes the apparatus of example 17 or 22, wherein the one or more processors and memory are further configured to generate a bundled short TTI by bundling a plurality of short TTIs, wherein the plurality of short TTIs include a fixed number of the short TTI, wherein the fixed number of short TTI includes one or more symbols in a downlink bundle and one or more symbols in an uplink bundle.

Example 25 includes the apparatus of example 17 or 23, wherein the one or more processors and memory are further configured to use the short TTI or the bundled short TTI according to a defined resource allocation for each of the short TTI RB sets.

Example 26 includes the apparatus of example 17 or 23, wherein the short TTI RB set is a subset of resources available for the legacy TTI.

Example 27 includes at least one machine readable storage medium having instructions embodied thereon for an eNodeB to perform short transmission time interval (TTI) data transmission with a user equipment (UE), the instructions when executed cause the eNodeB to: define, for the short TTI, a short TTI resource block (RB) set from resources allocated for a legacy TTI that has a duration of at least one (1) millisecond TTI according to a frequency division or time division for uplink transmission or downlink transmission; define resources allocated for the legacy TTI that are protected from being used for the short TTI; process, for transmission to the UE, control information within the short TTI over the short TTI RB set within a short physical downlink control channel (S-PDCCH), wherein the short TTI is shorter in time than the TTI, and wherein the S-PDCCH is a subset of resources available for a short physical downlink shared channel (S-PDSCH) and the S-PDCCH is a subset of resources available for a PDSCH transmission; and process, for transmission to the UE, data within the short TTI over the short TTI RB set within the S-PDSCH.

Example 28 includes the at least one machine readable storage medium of example 27, further comprising instructions which when executed cause the eNodeB to: process, for reception from the UE, control information within the short TTI over another short TTI resource block (RB) set within a short physical uplink control channel (S-PUCCH), wherein the S-PUCCH is a subset of resources available for a short physical uplink shared channel (S-PUSCH) and the S-PUSCH is a subset of resources available for a PUSCH transmission; and process, for reception from the UE, data within the short TTI over the short TTI RB set within the S-PUSCH.

Example 29 includes the at least one machine readable storage medium of example 27 or 28, wherein the short TTI is equal to or less than 1 millisecond (ms) or equal to or less than 0.5 ms.

Example 30 includes the apparatus of example 27, wherein the short TTI is defined as equal to one or more orthogonal frequency multiple access (OFDMA) symbols.

Example 31 includes an apparatus of a user equipment (UE), the UE configured to perform short transmission time interval (TTI) data transmission, the apparatus comprising one or more processors and memory configured to: process, for transmission to an eNodeB, control information within a short transmission time interval (TTI) over a short TTI resource block (RB) set within a short physical uplink control channel (S-PUCCH), wherein the short TTI is shorter in time than a legacy TTI that has a duration of at least one (1) millisecond, and wherein the S-PUCCH is a subset of resources available for a short physical uplink shared channel (S-PUSCH) and the S-PUSCH is a subset of resources available for a PUSCH transmission; and process, for transmission to the eNodeB, data within the short TTI over the short TTI RB set within the S-PUSCH.

Example 32 includes the apparatus of example 31, wherein the short TTI RB set are semi-statically or dynamically allocated.

Example 33 includes the apparatus of example 31, wherein the one or more processors and memory are further configured to accommodate eNodeB scheduling for the short TTI.

Example 34 includes the apparatus of example 31, wherein the one or more processors and memory are further configured to process, for uplink transmission to or downlink transmission from an eNodeB, the data communicated on the short TTI RB set allocated for the short TTI that is equal to or less than one (1) millisecond (ms) in a same frequency of alternative data being transmitted using the legacy TTI.

Example 35 includes the apparatus of example 31, wherein the short TTI is defined as less than one (1) millisecond (ms).

Example 36 includes the apparatus of example 31, wherein the short TTI is defined as equal to one or more orthogonal frequency multiple access (OFDMA) symbols.

Example 37 includes the apparatus of example 31, wherein the one or more processors and memory are further configured to detect control regions and data regions in the short TTI RB set allocated for the short TTI.

Example 38 includes the apparatus of example 31, wherein the one or more processors and memory are further configured to monitor a control region in the short TTI RB set allocated for the short TTI.

Example 39 includes the apparatus of example 31, wherein the one or more processors and memory are further configured to blindly detect the short TTI RB set allocated for the short TTI.

Example 40 includes the apparatus of example 31, wherein the one or more processors and memory are further configured to multiplex data transmissions using the legacy TTI and data transmissions using the short TTI.

Example 41 includes the apparatus of example 31, wherein the one or more processors and memory are further configured to use the short TTI or the legacy TTI for a selected subframe.

Example 42 includes the apparatus of example 31, wherein the short TTI RB set allocated for the short TTI is signaled from the eNodeB by upper layer signaling.

Example 43 includes the apparatus of example 31, wherein the short TTI RB set allocated for the short TTI is signaled using the legacy physical downlink control channel (PDCCH) masked with a specific radio network temporary identifier (RNTI).

Example 44 includes the apparatus of example 31, wherein the one or more processors and memory are further configured to: generate a bundled short TTI by bundling one or more short TTI; or use a defined downlink control information (DCI) format in the short TTI control region to determine a number of the bundled short TTI.

Example 45 includes the apparatus of example 31, wherein the apparatus includes at least one of an antenna, a touch sensitive display screen, a speaker, a microphone, a graphics processor, an application processor, a baseband processor, an internal memory, a non-volatile memory port, and combinations thereof.

Example 46 includes the apparatus of example 31, wherein the control information and the data are processed for transmission using a baseband processor.

Example 47 includes an apparatus of an eNodeB, the eNodeB configured to perform short transmission time interval (TTI) data transmission with a User Equipment (UE), the apparatus comprising one or more processors and memory configured to: process, for transmission to a UE, control information within a short transmission time interval (TTI) over a short TTI resource block (RB) set within a short physical downlink control channel (S-PDCCH), wherein the short TTI is shorter in time than a legacy TTI that has a duration of at least one (1) millisecond, and wherein the S-PDCCH is a subset of resources available for a short physical downlink shared channel (S-PDSCH) and the S-PDSCH is a subset of resources available for a PDSCH transmission; and process, for transmission to the UE, data within the short TTI over the short TTI RB set within the S-PDSCH.

Example 48 includes the apparatus of example 47, wherein the short TTI is less than 1 millisecond (ms) or equal to or less than 0.5 ms.

Example 49 includes the apparatus of example 47, wherein the short TTI is defined as equal to one or more orthogonal frequency multiple access (OFDMA) symbols.

Example 50 includes the apparatus of example 47, wherein the one or more processors and memory are further configured to multiplex data of the legacy TTI and data of the short TTI using frequency division multiplexing (FDM).

Example 51 includes the apparatus of example 47, wherein the one or more processors and memory are further configured to interleave frequency regions of the TTI and the short TTI for a downlink while designating the legacy TTI and the short TTI as a continuous frequency region for an uplink.

Example 52 includes the apparatus of example 47, wherein the one or more processors and memory are further configured to: use the short TTI in a selected subframe for transmitting data to or receiving data from the UE; use the legacy TTI and the short TTI for transmitting data to or receiving data from the UE in a selected subframe; transmit data in the short TTI using only one transport block (TB); schedule a contiguous set of the short TTI RB set in a frequency domain for transmitting data in the short TTI;

or schedule data, for transmission to the UE, according to the short TTI over the another short TTI RB set within the PUCCH, wherein the other short TTI RB set is the subset of resources available for PUSCH transmissions.

Example 53 includes the apparatus of example 47, wherein the one or more processors and memory are further configured to determine the short TTI RB set in order to monitor a short TTI control region, wherein the short TTI RB set is scheduled according to static scheduling, wherein the short TTI RB set is located in a same one or more resource elements (REs) in each subframe, or the short TTI RB set is scheduled according to dynamic scheduling, wherein the short TTI RB set is located in different one or more resource elements (REs) in every subframe.

Example 54 includes the apparatus of example 47, wherein the one or more processors and memory are further configured to generate a bundled short TTI by bundling a plurality of short TTIs, wherein the plurality of short TTIs include a fixed number of the short TTI, wherein the fixed number of short TTI includes one or more symbols in a downlink bundle and one or more symbols in an uplink bundle.

Example 55 includes the apparatus of example 47, wherein the one or more processors and memory are further configured to use the short TTI or the bundled short TTI according to a defined resource allocation for each of the short TTI RB sets.

Example 56 includes the apparatus of example 47, wherein the short TTI RB set is a subset of resources available for the legacy TTI.

Example 57 includes at least one machine readable storage medium having instructions embodied thereon for an eNodeB to perform short transmission time interval (TTI) data transmission with a user equipment (UE), the instructions when executed cause the eNodeB to: define, for the short TTI, a short TTI resource block (RB) set from resources allocated for a legacy TTI that has a duration of at least one (1) millisecond TTI according to a frequency division or time division for uplink transmission or downlink transmission; define resources allocated for the legacy TTI that are protected from being used for e short TTI; process, for transmission to the UE, control information within the short TTI over the short TTI RB set within a short physical downlink control channel (S-PDCCH), wherein the short TTI is shorter in time than the TTI, and wherein the S-PDCCH is a subset of resources available for a short physical downlink shared channel (S-PDSCH) and the S-PDCCH is a subset of resources available for a PDSCH transmission; and process, for transmission to the UE, data within the short TTI over the short TTI RB set within the S-PDSCH.

Example 58 includes the at least one machine readable storage medium of example 57, further comprising instructions which when executed cause the eNodeB to: process, for reception from the UE, control information within the short TTI over another short TTI resource block (RB) set within a short physical uplink control channel (S-PUCCH), wherein the S-PUCCH is a subset of resources available for a short physical uplink shared channel (S-PUSCH) and the S-PUSCH is a subset of resources available for a PUSCH transmission; and process, for reception from the UE, data within the short TTI over the short TTI RB set within the S-PUSCH.

Example 59 includes the at least one machine readable storage medium of example 57, wherein the short TTI is equal to or less than 1 millisecond (ms) or equal to or less than 0.5 ms.

Example 60 includes the at least one machine readable storage medium of example 57, wherein the short TTI is defined as equal to one or more orthogonal frequency multiple access (OFDMA) symbols.

Example 61 includes an apparatus of a user equipment (UE), the UE configured to perform short transmission time interval (TTI) data transmission, the apparatus comprising one or more processors and memory configured to: process, for transmission to an eNodeB, control information within a short transmission time interval (TTI) over a short TTI resource block (RB) set within a short physical uplink control channel (S-PUCCH), wherein the short TTI is shorter in time than a legacy TTI that has a duration of at least one (1) millisecond, and wherein the S-PUCCH is a subset of resources available for a short physical uplink shared channel (S-PUSCH) and the S-PUSCH is a subset of resources available for a PUSCH transmission; and process, for transmission to the eNodeB, data within the short TTI over the short TTI RB set within the S-PUSCH.

Example 62 includes the apparatus of example 61, wherein the short TTI RB set are semi-statically or dynamically allocated.

Example 63 includes the apparatus of example 61 or 62, wherein the one or more processors and memory are further configured to: accommodate eNodeB scheduling for the short TTI; or process, for uplink transmission to or downlink transmission from an eNodeB, the data communicated on the short TTI RB set allocated for the short TTI that is equal to or less than one (1) millisecond (ms) in a same frequency of alternative data being transmitted using the legacy TTI.

In example 64, the subject matter of Example 61 or any of the Examples described herein may further include, wherein the short TTI is defined as less than one (1) millisecond (ms), or the short TTI is defined as equal to one or more orthogonal frequency multiple access (OFDMA) symbols.

In example 65, the subject matter of Example 61 or any of the Examples described herein may further include, wherein the one or more processors and memory are further configured to: detect control regions and data regions in the short TTI RB set allocated for the short TTI; monitor a control region in the short TTI RB set allocated for the short TTI; blindly detect the short TTI RB set allocated for the short TTI; multiplex data transmissions using the legacy TTI and data transmissions using the short TTI; use the short TTI or the legacy TTI for a selected subframe; generate a bundled short TTI by bundling one or more short TTI; or use a defined downlink control information (DCI) format in the short TTI control region to determine a number of the bundled short TTI.

In example 66, the subject matter of Example 61 or any of the Examples described herein may further include, wherein the short TTI RB set allocated for the short TTI is signaled from the eNodeB by upper layer signaling, or the short TTI RB set allocated for the short TTI is signaled using the legacy physical downlink control channel (PDCCH) masked with a specific radio network temporary identifier (RNTI).

In example 67, the subject matter of Example 61 or any of the Examples described herein may further include, wherein the control information and the data are processed for transmission using a baseband processor.

In example 68, the subject matter of Example 61 or any of the Examples described herein may further include, wherein the apparatus includes at least one of an antenna, a touch sensitive display screen, a speaker, a microphone, a graphics processor, an application processor, a baseband processor, an internal memory, a non-volatile memory port, and combinations thereof.

Example 69 includes an apparatus of an eNodeB, the eNodeB configured to perform short transmission time interval (TTI) data transmission with a User Equipment (UE), the apparatus comprising one or more processors and memory configured to: process, for transmission to a UE, control information within a short transmission time interval (TTI) over a short TTI resource block (RB) set within a short physical downlink control channel (S-PDCCH), wherein the short TTI is shorter in time than a legacy TTI that has a duration of at least one (1) millisecond, and wherein the S-PDCCH is a subset of resources available for a short physical downlink shared channel (S-PDSCH) and the S-PDSCH is a subset of resources available for a PDSCH transmission; and process, for transmission to the UE, data within the short TTI over the short TTI RB set within the S-PDSCH.

Example 70 includes the apparatus of example 69, wherein the short TTI is less than 1 millisecond (ms) or equal to or less than 0.5 ms, or the short TTI is defined as equal to one or more orthogonal frequency multiple access (OFDMA) symbols.

Example 71 includes the apparatus of example 69 or 70, wherein the one or more processors and memory are further configured to: multiplex data of the legacy TTI and data of the short TTI using frequency division multiplexing (FDM); interleave frequency regions of the TTI and the short TTI for a downlink while designating the legacy TTI and the short TTI as a continuous frequency region for an uplink; use the short TTI in a selected subframe for transmitting data to or receiving data from the UE; use the legacy TTI and the short TTI for transmitting data to or receiving data from the UE in a selected subframe; transmit data in the short TTI using only one transport block (TB); schedule a contiguous set of the short TTI RB set in a frequency domain for transmitting data in the short TTI; schedule data, for transmission to the UE, according to the short TTI over the another short TTI RB set within the PUCCH, wherein the other short TTI RB set is the subset of resources available for PUSCH transmissions; determine the short TTI RB set in order to monitor a short TTI control region, wherein the short TTI RB set is scheduled according to static scheduling, wherein the short TTI RB set is located in a same one or more resource elements (REs) in each subframe, or the short TTI RB set is scheduled according to dynamic scheduling, wherein the short TTI RB set is located in different one or more resource elements (REs) in every subframe; generate a bundled short TTI by bundling a plurality of short TTIs, wherein the plurality of short TTIs include a fixed number of the short TTI, wherein the fixed number of short TTI includes one or more symbols in a downlink bundle and one or more symbols in an uplink bundle; or use the short TTI or the bundled short TTI according to a defined resource allocation for each of the short TTI RB sets.

In example 72, the subject matter of Example 69 or any of the Examples described herein may further include, wherein the short TTI RB set is a subset of resources available for the legacy TTI.

Example 73 includes at least one machine readable storage medium having instructions embodied thereon for an eNodeB to perform short transmission time interval (TTI) data transmission with a user equipment (UE), the instructions when executed cause the eNodeB to: define, for the short TTI, a short TTI resource block (RB) set from resources allocated for a legacy TTI that has a duration of at least one (1) millisecond TTI according to a frequency division or time division for uplink transmission or downlink transmission; define resources allocated for the legacy TTI that are protected from being used for the short TTI; process, for transmission to the UE, control information within the short TTI over the short TTI RB set within a short physical downlink control channel (S-PDCCH), wherein the short TTI is shorter in time than the TTI, and wherein the S-PDCCH is a subset of resources available for a short physical downlink shared channel (S-PDSCH) and the S-PDCCH is a subset of resources available for a PDSCH transmission; and process, for transmission to the UE, data within the short TTI over the short TTI RB set within the S-PDSCH.

Example 74 includes at least one machine readable storage medium of example 73, further comprising instructions which when executed cause the eNodeB to: process, for reception from the UE, control information within the short TTI over another short TTI resource block (RB) set within a short physical uplink control channel (S-PUCCH), wherein the S-PUCCH is a subset of resources available for a short physical uplink shared channel (S-PUSCH) and the S-PUSCH is a subset of resources available for a PUSCH transmission; and process, for reception from the UE, data within the short TTI over the short TTI RB set within the S-PUSCH.

Example 75 includes at least one machine readable storage medium of example 73 or 74, wherein the short TTI is equal to or less than 1 millisecond (ms) or equal to or less than 0.5 ms, or the short TTI is defined as equal to one or more orthogonal frequency multiple access (OFDMA) symbols.

Example 76 includes a device to perform short transmission time interval (TTI) data transmission with a user equipment (UE), the device comprising: means for defining, for the short TTI, a short TTI resource block (RB) set from resources allocated for a legacy TTI that has a duration of at least one (1) millisecond TTI according to a frequency division or time division for uplink transmission or downlink transmission; means for defining resources allocated for the legacy TTI that are protected from being used for the short TTI; means for processing, for transmission to the UE, control information within the short TTI over the short TTI RB set within a short physical downlink control channel (S-PDCCH), wherein the short TTI is shorter in time than the TTI, and wherein the S-PDCCH is a subset of resources available for a short physical downlink shared channel (S-PDSCH) and the S-PDCCH is a subset of resources available for a PDSCH transmission; and means for processing, for transmission to the UE, data within the short TTI over the short TTI RB set within the S-PDSCH.

Example 77 includes the device of example 76, further comprising means for: processing, for reception from the UE, control information within the short TTI over another short TTI resource block (RB) set within a short physical uplink control channel (S-PUCCH), wherein the S-PUCCH is a subset of resources available for a short physical uplink shared channel (S-PUSCH) and the S-PUSCH is a subset of resources available for a PUSCH transmission; and processing, for reception from the UE, data within the short TTI over the short TTI RB set within the S-PUSCH.

Example 78 includes the device of example 76, wherein the short TTI is equal to or less than 1 millisecond (ms) or equal to or less than 0.5 ms.

Example 79 includes the device of example 76, wherein the short TTI is defined as equal to one or more orthogonal frequency multiple access (OFDMA) symbols.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to “an example” or “exemplary” means that a particular feature, structure, or characteristic described in connection with the example is included in at least one embodiment of the present technology. Thus, appearances of the phrases “in an example” or the word “exemplary” in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A method of a user equipment (UE), comprising:

blindly detecting a first transmission time interval (TTI) resource block (RB) set allocated for a first TTI;

processing, for transmission to a base station, control information within the first TTI over the first TTI RB set within a first physical uplink control channel (PUCCH), wherein the first TTI is shorter in time than a legacy TTI that has a duration of at least one (1) millisecond, and wherein the first PUCCH is a subset of resources available for a first physical uplink shared channel (PUSCH) and the first PUSCH is a subset of resources available for a PUSCH transmission, and resources for the first TTI are allocated dynamically using a downlink control information (DCI) format on a physical downlink control channel (PDCCH);

processing, for transmission to the base station, data within the first TTI over the first TTI RB set within the first PUSCH, the data communicated over the first TTI RB set allocated for the first TTI that is equal to or less than one (1) millisecond (ms) being in a same frequency of alternative data being transmitted using the legacy TTI, wherein frequency regions of the legacy TTI and the first TTI are interleaved for a downlink while the legacy TTI and the first TTI are designated as a continuous frequency region for an uplink;

generating a bundled first TTI by bundling the first TTI with one or more additional first TTI;

using a defined DCI format in the first TTI control region to determine a number of the bundled first TTI; and accommodating base station scheduling for the bundled first TTI.

2. The method of claim 1, further comprising processing, for downlink transmission from the base station, the data communicated on the first TTI RB set allocated for the first TTI that is equal to or less than one (1) millisecond (ms) being in a same frequency of alternative data being transmitted using the legacy TTI.

3. The method of claim 1, wherein the first TTI is defined as 0.1 milliseconds (ms).

4. The method of claim 1, wherein the first TTI is defined as equal to one or more orthogonal frequency multiple access (OFDMA) symbols.

5. The method of claim 1, further comprising detecting control regions and data regions in the first TTI RB set allocated for the first TTI.

6. The method of claim 1, further comprising monitoring a control region in the first TTI RB set allocated for the first TTI.

7. The method of claim 1, further comprising multiplexing data transmissions using the legacy TTI and data transmissions using the first TTI.

8. The method of claim 1, further comprising using the first TTI or the legacy TTI for a selected subframe.

9. The method of claim 1, wherein the first TTI RB set allocated for the first TTI is signaled from the base station by upper layer signaling.

10. The method of claim 1, wherein the UE includes at least one of an antenna, a touch sensitive display screen, a speaker, a microphone, a graphics processor, an application processor, a baseband processor, an internal memory, a non-volatile memory port, and combinations thereof.

11. The method of claim 1, wherein the control information and the data are processed for transmission using a baseband processor of the UE.

12. A method of a base station, comprising:

processing, for transmission to a user equipment (UE), control information within a first transmission time interval (TTI) over a first TTI resource block (RB) set within a first physical downlink control channel (PDCCH), wherein the first TTI is shorter in time than a legacy TTI that has a duration of at least one (1) millisecond, and wherein the first PDCCH is a subset of resources available for a first physical downlink shared channel (PDSCH) and the first PDSCH is a subset of resources available for a PDSCH transmission, and resources for the first TTI are allocated dynamically using a downlink control information (DCI) format on a PDCCH, wherein the first TTI RB set allocated for the first TTI is signaled using a legacy PDCCH masked with a specific radio network temporary identifier (RNTI);

processing, for transmission to the UE, data within the first TTI over the first TTI RB set within the first PDSCH, the data communicated over the first TTI RB set allocated for the first TTI that is equal to or less than one (1) millisecond (ms) being in a same frequency of alternative data being transmitted using the legacy TTI, wherein frequency regions of the legacy TTI and the first TTI are interleaved for a downlink while the legacy TTI and the first TTI are designated as a continuous frequency region for an uplink;

generating a bundled first TTI by bundling the first TTI with one or more additional first TTI; and using a defined DCI format in the first TTI control region to determine a number of the bundled first TTI.

13. The method of claim 12, wherein the first TTI is less than 1 millisecond (ms) or equal to or less than 0.5 ms.

14. The method of claim 12, wherein the first TTI is defined as equal to one or more orthogonal frequency multiple access (OFDMA) symbols.

15. The method of claim 12, further comprising multiplexing data of the legacy TTI and data of the first TTI using frequency division multiplexing (FDM).

16. The method of claim 12, further comprising:

using the first TTI in a selected subframe for transmitting data to or receiving data from the UE;

using the legacy TTI and the first TTI for transmitting data to or receiving data from the UE in a selected subframe;

transmitting data in the first TTI using only one transport block (TB);

scheduling a contiguous set of the first TTI RB set in a frequency domain for transmitting data in the first TTI; or scheduling data, for transmission to the UE, according to the first TTI over another first TTI RB set within a PUCCH, wherein the other first TTI RB set is the subset of resources available for PUSCH transmissions.

17. The method of claim 12, further comprising determining the first TTI RB set in order to monitor a first TTI control region, wherein the first TTI RB set is scheduled according to static scheduling, wherein the first TTI RB set is located in a same one or more resource elements (REs) in each subframe, or the first TTI RB set is scheduled according to dynamic scheduling, wherein the first TTI RB set is located in different one or more resource elements (REs) in every subframe.

18. The method of claim 12, further comprising generating a bundled first TTI by bundling a plurality of first TTIs, wherein the plurality of first TTIs include a fixed number of the first TTI, wherein the fixed number of first TTI includes one or more symbols in a downlink bundle and one or more symbols in an uplink bundle.

19. The method of claim 12, further comprising using the first TTI or the bundled first TTI according to a defined resource allocation for each of the first TTI RB sets.

20. The method of claim 12, further comprising:

processing, for reception from the UE, control information within the first TTI over another first TTI resource block (RB) set within a first physical uplink control channel (PUCCH), wherein the first PUCCH is a subset of resources available for a first physical uplink shared channel (PUSCH) and the first PUSCH is a subset of resources available for a PUSCH transmission; and processing, for reception from the UE, data within the first TTI over the first TTI RB set within the first PUSCH.

* * * * *